US006698551B2

(12) United States Patent
Clancy et al.

(10) Patent No.: US 6,698,551 B2
(45) Date of Patent: Mar. 2, 2004

(54) MODULAR LUBRICATING SYSTEM AND INJECTOR

(75) Inventors: Stephen M. Clancy, Washington, MI (US); Jeffrey M. Kotyk, St. Louis, MO (US)

(73) Assignee: Lincoln Industrial Corporation, St. Louis, MO (US)

(*) Notice: Subject to any disclaimer, the term of this patent is extended or adjusted under 35 U.S.C. 154(b) by 25 days.

(21) Appl. No.: 10/115,102

(22) Filed: Apr. 2, 2002

(65) Prior Publication Data

US 2002/0144865 A1 Oct. 10, 2002

Related U.S. Application Data

(60) Provisional application No. 60/282,744, filed on Apr. 10, 2001.

(51) Int. Cl.⁷ .............................. F16N 7/30; F16N 7/34
(52) U.S. Cl. ..................................... 184/55.1; 184/50.1
(58) Field of Search .............................. 184/55.1, 55.2, 184/57, 50.1, 53, 7.4

(56) References Cited

U.S. PATENT DOCUMENTS

| 4,147,234 A | * | 4/1979 | Lewkowicz et al. | 184/6.26 |
| 4,169,520 A | * | 10/1979 | Lewkowicz et al. | 184/7.4 |
| 4,627,457 A | * | 12/1986 | Bird et al. | 137/1 |
| 4,785,913 A | | 11/1988 | Maurer et al. | |
| 5,205,378 A | * | 4/1993 | Boelkins | 184/55.1 |
| 5,948,968 A | * | 9/1999 | Ehlert | 73/30.04 |
| 2002/0189904 A1 | * | 12/2002 | Naumann et al. | 184/105.3 |

OTHER PUBLICATIONS

Alemite Corporation publication, entitled "When mechanical performance is vital . . . Alemite Oil–Mist Lubrication Systems deliver.", 2001, 2 pages (Admitted to be Prior Art).

Alemite Corporation publication, entitled "A revolutionary Lubricating System", 2001, 3 pages, (Admitted to be Prior Art).

Lincoln Industrial brochure, entitled ORSCO® Series 150, dated 1999, front and back page.

Master Pneumatic–Detroit, Inc., entitled "Servo–Meter: Key SERV–OIL Module, Series 700—SERVO–METER", page 7 (date unknown) (Admitted to be Prior Art).

Master Pneumatic–Detroit, Inc., entitled "Multiple Point Lubricator (MPL) Modular Assembly of Servo–Meters, Series 710 and 720 Multiple Point Lubricators", page 8 (date unknown) (Admitted to be Prior Art).

* cited by examiner

Primary Examiner—David Fenstermacher
(74) Attorney, Agent, or Firm—Senniger, Powers, Leavitt & Roedel

(57) ABSTRACT

A lubricating system for delivering charges of lubricant and air for aerifying the lubricant to multiple points of lubrication. The system comprises a series of air-operated lubricant injectors each of which is operable in response to delivery thereto of operating air to deliver a charge of lubricant. The injectors are organized in a row in engagement with one another. Each injector has a lubricant passage extending through it, the lubricant passages in the injectors being in end-to-end communication with one another to form a lubricant manifold extending through the row for receiving lubricant and charging the injectors. Each injector also has first and second air passages therein, the first air passages being in end-to-end communication with one another and forming a first air manifold for receiving injector operating air and delivering it for operating the injectors, and the second air passages also being in end-to-end communication with one another and forming a second air manifold for receiving air for aerifying the charge of lubricant delivered by the injectors.

14 Claims, 25 Drawing Sheets

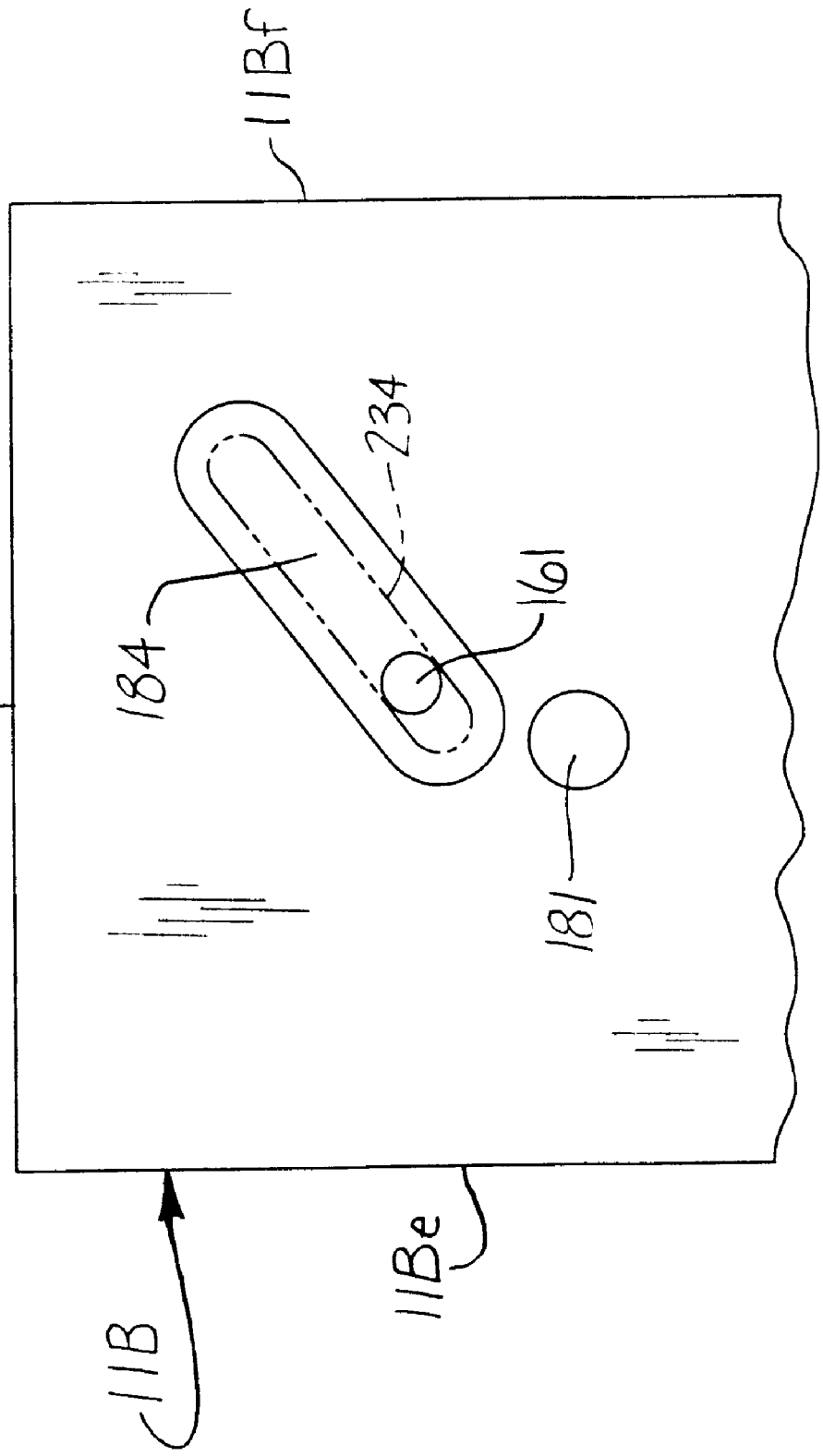

ND INJECTOR

CROSS-REFERENCE TO RELATED APPLICATION

This application claims the benefit of U.S. Provisional Application No. 60/282,744, filed Apr. 10, 2001.

BACKGROUND OF THE INVENTION

This invention relates generally to a modular lubricating system, more particularly to a lubricating system (or apparatus) which utilizes modular injectors for delivering charges of lubricant to points of lubrication, and to a modular injector (lubricant and air injector) per se.

This invention is especially (albeit not exclusively) applicable to injector lubrication systems of the type shown in U.S. Pat. No. 4,785,913 which is incorporated herein by reference for all purposes. In this type of system, a charge of lubricant is delivered by an injector to a nozzle, where the charge of lubricant is subjected to a pulse of pressurized air and sprayed onto a point of lubrication (e.g., a moving chain). The injector is typically an expansible chamber device, comprising a piston movable in a cylinder operated by air (denoted "injector air") under pressure. The pressurized "nozzle air" necessary for aerifying the lubricant at the nozzle and the pressurized "injector air" used for operating the injector are typically provided from a suitable source (e.g., shop air) via separate air lines. One or more pressure regulators are often used to regulate the pressure in these lines. A first solenoid-operated valve in the injector air line operates to deliver pressurized injector air intermittently to the injector. A second solenoid valve in the nozzle air line operates to deliver nozzle air (aerifying air) intermittently to the nozzle. For multiple points of lubrication, a series of injectors are used in combination, with each injector having a single outlet for the delivery of lubricant to a respective nozzle. The injectors are supplied with lubricant from a supply, e.g., a reservoir mounted close to the injectors. The various electrical components of the system are under the control of a controller. While the operation of the above system is generally satisfactory, the numerous components of the system make installation and maintenance of the system relatively time-consuming and the system also has certain mounting requirements that restrict the locations at which the injectors can be mounted.

SUMMARY OF THE INVENTION

Among the several objects of this invention may be noted the provision of a lubrication system (or apparatus) which is modular in construction for facilitating installation and maintenance thereof, and for providing greater flexibility with respect to lubricant and air delivery configurations; the provision of such a system enabling integration of injectors, air pressure regulators, injector air on/off control and nozzle air on/off control to be integrated in one assembly allowing compact, cost-effective production of an assembly imparting flexibility to the system making it adaptable to various applications; the provision of such a system adapted for the mounting thereof in such a location as may be convenient, requiring only the connection of shop air and an electrical supply; the provision of a modular injector configured to allow the outlet of the lubricant (e.g., oil) supply to the nozzle and the air supply to the nozzle to originate differently, thereby allowing greater flexibility in mounting the system in such manner as to direct lubrication and air lines emanating from the system to be routed to remotely located nozzles more efficiently; the provision of such an injector a set of which may be established for obtaining a range of lubricant output volume from two different sizes while maintaining the accuracy or reproducibility of the output for any given output setting; the provision of such an injector achieving relatively better accuracy of lubricant output; the provision of such an injector having the capability of removal of air from the lubricant for positive priming; and the provision of a relatively economical and reliable system and injector having the above advantages.

In general, the lubrication system of this invention, which is for delivering charges of lubricant and air for aerifying the lubricant to multiple points of lubrication, comprises a plurality of air-operated lubricant injectors each operable in response to delivery thereto of operating air to deliver a charge of lubricant, said injectors being organized in a row in engagement with one another. Each injector has a lubricant passage extending therethrough, the lubricant passages in the injectors being in end-to-end communication with one another and constituting a lubricant manifold extending through the row for receiving lubricant and charging said injectors therewith. Each injector also has a first air passage therein, the first air passages of the injectors being in end-to-end communication with one another and constituting a first air manifold extending through the row for receiving injector operating air and delivering it for operating the injectors. Each injector also has a second air passage therein for receiving air for aerifying the charge of lubricant delivered by the injector, the second air passages being in end-to-end communication with one another and constituting a second air manifold extending through the row.

In general, the injector of this invention, which is for delivering lubricant and air for being sprayed on a point of lubrication, comprises an elongate block having first and second opposite sides and first and second opposite ends, said block having an air-operated positive displacement expansible chamber device therein and a lubricant exit passage extending from the device to a lubricant outlet in the block. Further, the block has a lubricant supply passage therein extending from one side thereof to the other and a port for communication from the lubricant supply passage to the expansible chamber device. The block also has a first air passage extending from one side thereof to the other for receiving operating air and delivering it to the expansible chamber device, and a second air passage extending from one side of the block to the other for receiving air and for delivering it to aerify a charge of lubricant delivered by the expansible chamber device.

Other objects and features will be in part apparent and in part pointed out hereinafter.

BRIEF DESCRIPTION OF THE DRAWINGS

FIG. 13A is a fragmentary view on line 13A—13A of FIG. 13;

Corresponding reference characters indicate corresponding parts throughout the several views of the drawings.

DESCRIPTION OF PREFERRED EMBODIMENTS

Figure 1:
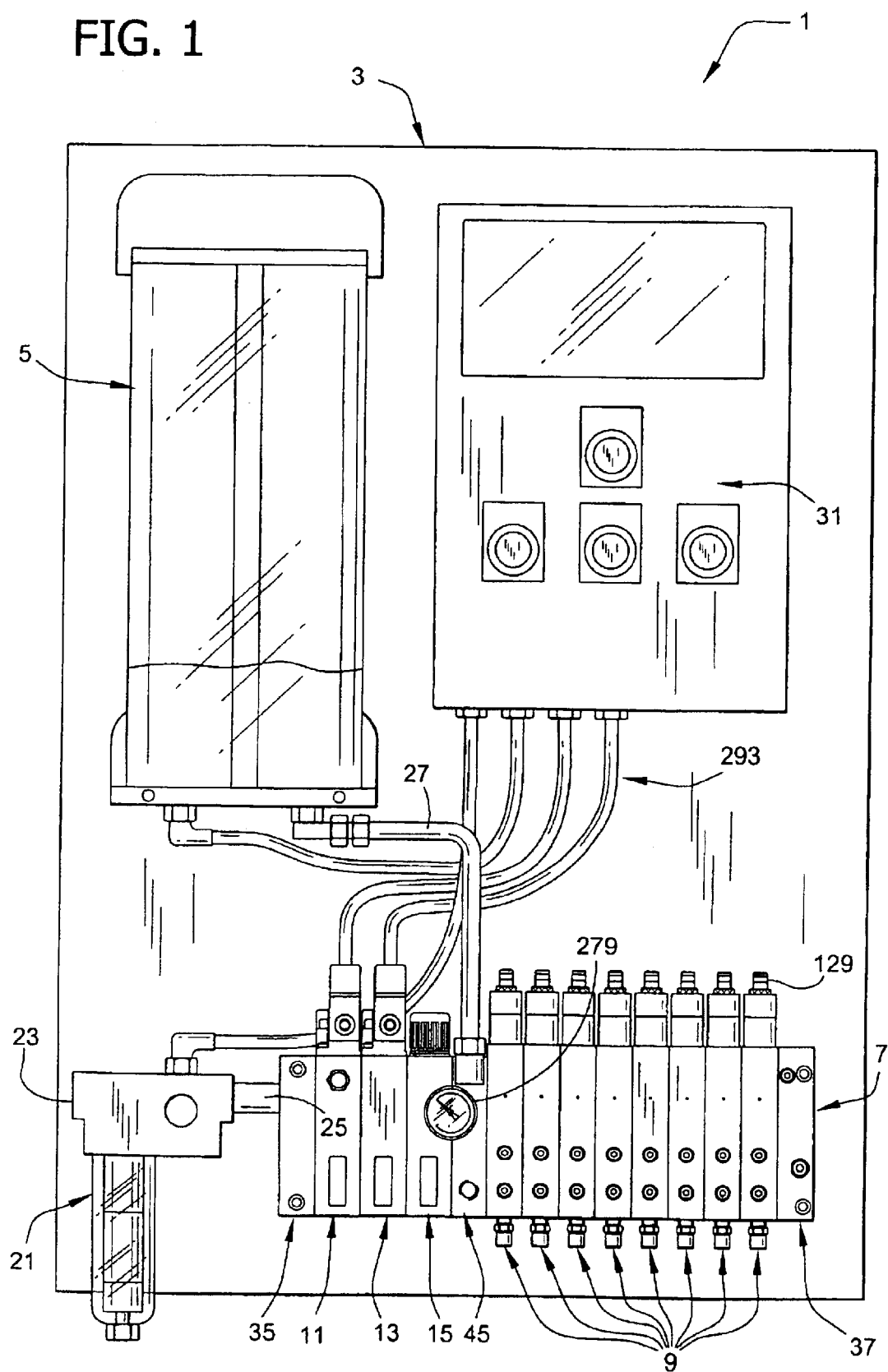
FIG. 1 is a view in front elevation of a lubricating system of this invention having eight modular lubricant injectors.
Figure 2:
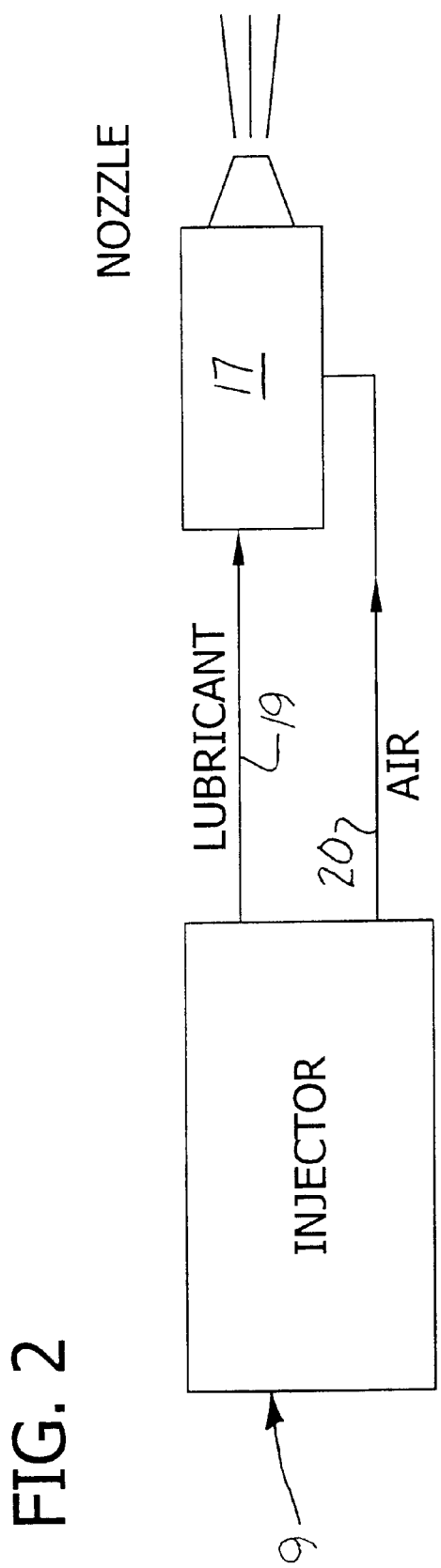
FIG. 2 is a diagrammatic view showing the delivery of lubricant and aerifying air by an injector to a nozzle for the spraying of the lubricant on a point of lubrication.

Referring to the drawings, first more particularly to FIG. 1, a lubrication system (or apparatus) of the present invention is designated in its entirety by the reference numeral 1. In general, it includes a panel 3, a reservoir 5 mounted on the panel for holding a supply of lubricant (e.g., oil), and a series or bank of modules held in assembly and in engagement with one another mounted on the panel. The modular assembly, designated 7 in its entirety, includes a plurality of air-operated lubricant injectors 9 (eight injector modules being shown), organized in a row. Each of these injectors is operable in response to delivery thereto of operating ("injector") air to deliver a charge of lubricant to a dispenser such as a nozzle of the type shown in the aforementioned U.S. Pat. No. 4,785,913. The assembly 7 also includes a first valve module 11 for controlling the delivery of "injector air" to the injector modules 9, and a second valve module 13 for controlling the delivery of "aerifying air" to an air pressure regulator module 15 for regulating the pressure of "aerifying air" delivered to the injector modules 9. As will be explained below, lubricant is delivered from each injector module 9 to a respective dispenser (e.g., the nozzle 17 shown in FIG. 2) at a point of lubrication by means of lubricant line 19, and pressurized aerifying air is delivered from each injector module 9 to a respective dispenser by means of an air delivery line 20. (Pressurized aerifying air supplied to a nozzle may be referred to as "nozzle" air). Pressurized air supplied to the entire modular assembly 7 is filtered by means of a suitable filter 21 having an inlet 23 connected to a suitable source of air under pressure (e.g., shop air) and an outlet 25 connected to the assembly. Lubricant is supplied from the reservoir 5 to the assembly by a supply line 27, the feed typically being by gravity, although a pump can be used. The operation of various electrical components of the system is under the control of a conventional controller 31 such as Siemens Logo PLC.

Figure 3:
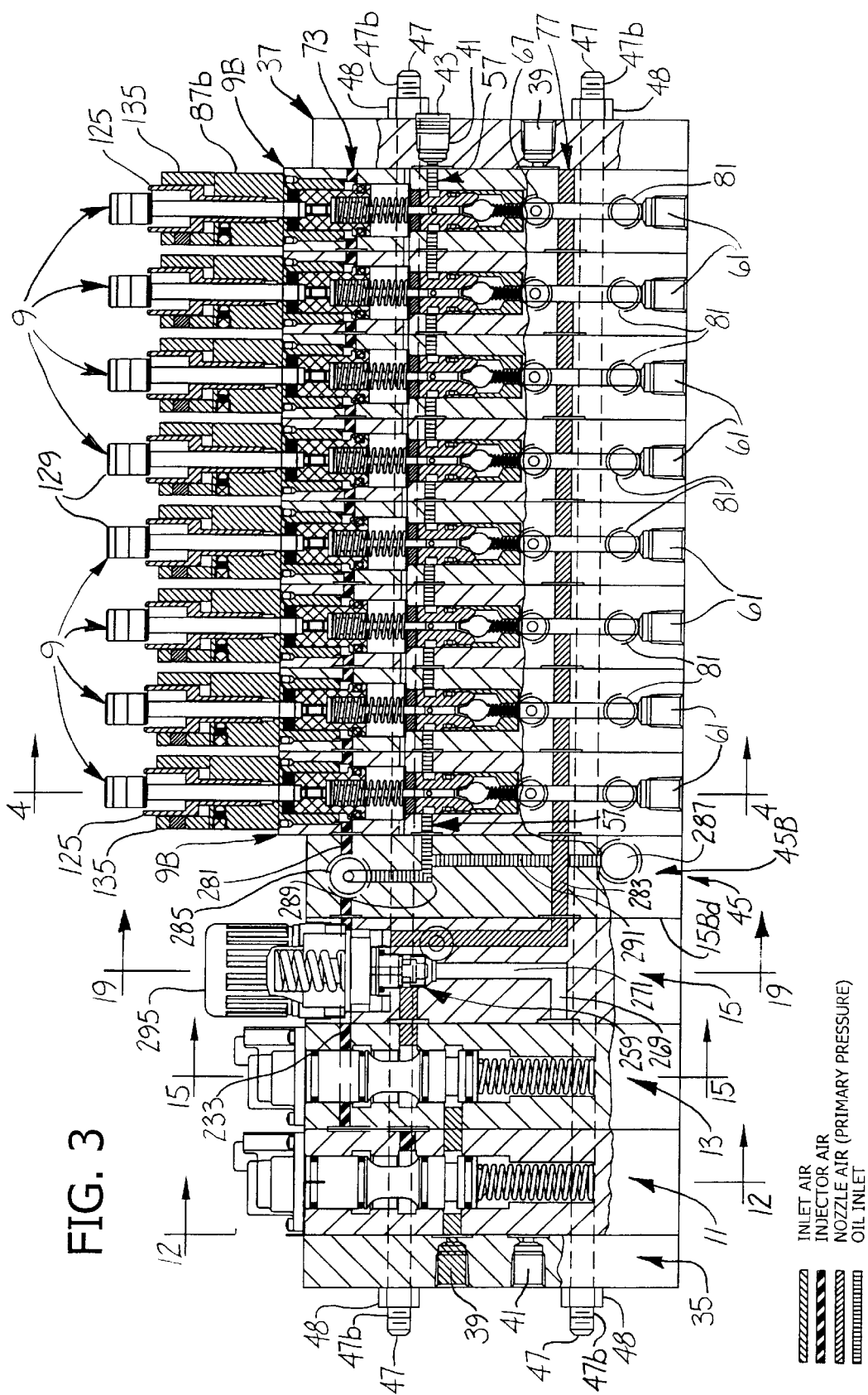
FIG. 3 is an enlarged fragment of FIG. 1 with parts broken away and shown in section, with inlet air, injector air, nozzle air, and lubricant (oil) passaging depicted according to the legend accompanying FIG. 3.

FIG. 3 shows the modular assembly 7 of the present invention comprising the aforementioned injectors 9 (injector modules), the first and second valve modules 11,13, and the air pressure regulator module 15. As shown in FIG. 3, the assembly 7 also includes first and second opposite end modules 35, 37 (see also FIG. 1), each having a pair of ports 39, 41 providing for reversibility of use of the end modules so that each end module can be used at either end of the assembly. As shown in FIG. 3, port 39 of the first end module 35 serves as main air inlet, and port 41 of the second end module 37 serves as a lubricant supply bleed port having a plug 43 removably threaded therein. The assembly 7 further includes a lubricant inlet module 45 disposed between the air pressure regulator module 15 and the first injector module 9 of the series or row of injector modules. The embodiment of FIGS. 1 and 3 includes eight injector modules 9 as shown, but any number of injector modules 9 may be used without departing from the scope of the invention. Each of the modules 35, 11, 13, 15, 45, 9 and 37 comprises, in one embodiment, an elongate metal block generally vertically oriented in the assembly 7, each block being generally of rectangular outline in transverse (horizontal) cross-section, and having an upper end, a lower end, opposite first and second sides, and a front and a back side (brick-shaped). Thus, each injector module 9 comprises such a block 9B, the upper end thereof being designated 9Ba, the lower end 9Bb, the first and second sides 9Bc and 9Bd, and the front and back sides being designated 9Be and 9Bf, respectively. The blocks 9B are organized side-by-side in a row with adjacent sides 9Bc, 9Bd in face-to-face (abutting) engagement, for enabling flow of lubricant and air from one block 9B to and through the next via passaging extending (horizontally) through the row, as will be detailed. All the blocks in assembly 7 (including the injector blocks 9B) are held in assembly (banked) side-by-side in a row by a plurality of tie rods 47 (e.g., three such rods) passing through aligned tie rod holes such as indicated at 47a in the blocks, the tie rods having nuts such as indicated at 48 threaded on threaded ends 47b thereof for clamping the blocks.

Figure 4:
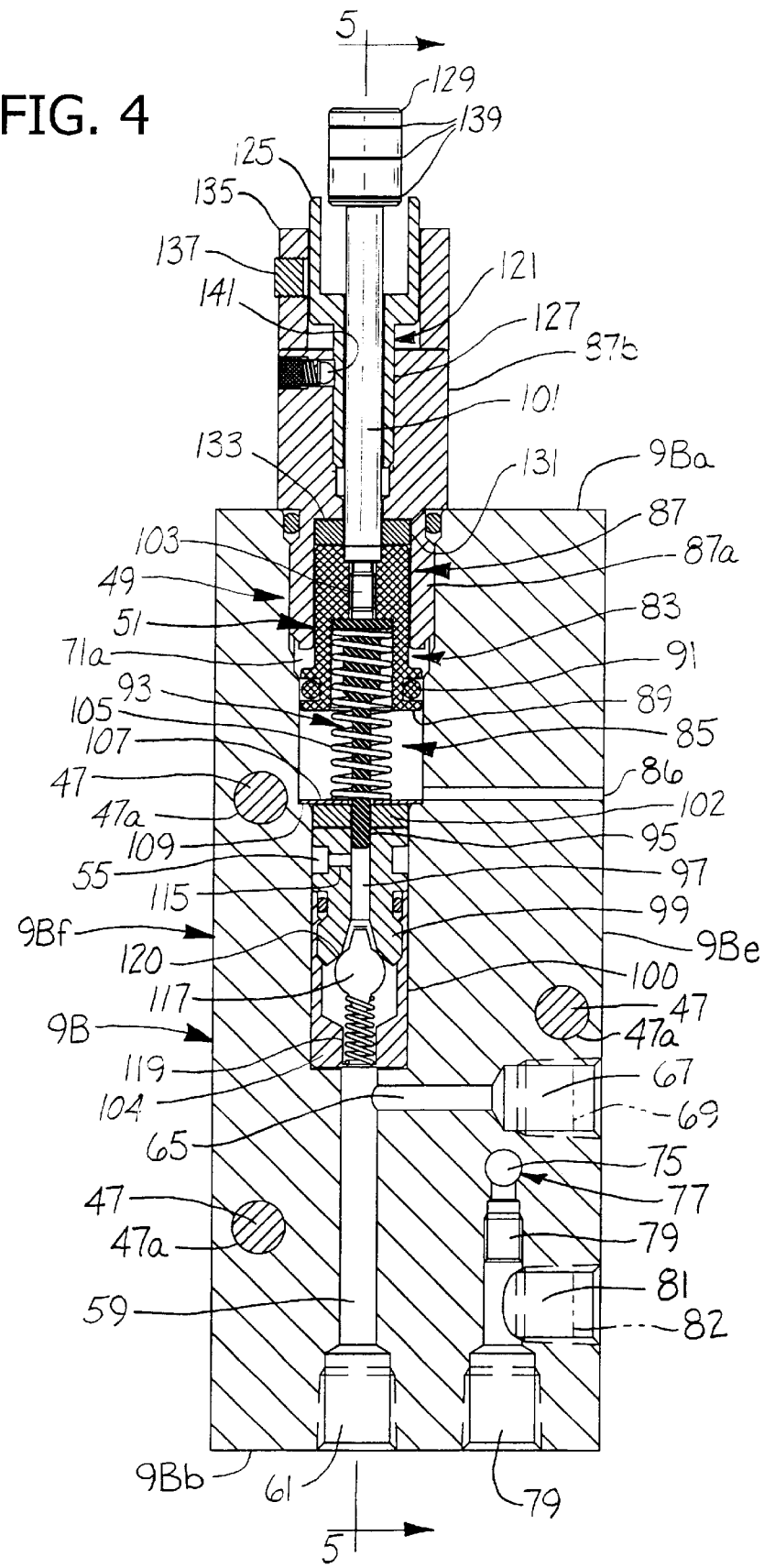
FIG. 4 is a view in cross-section of an injector taken generally on line 4—4 of FIG. 3, on a larger scale than FIG. 3.
Figure 5:
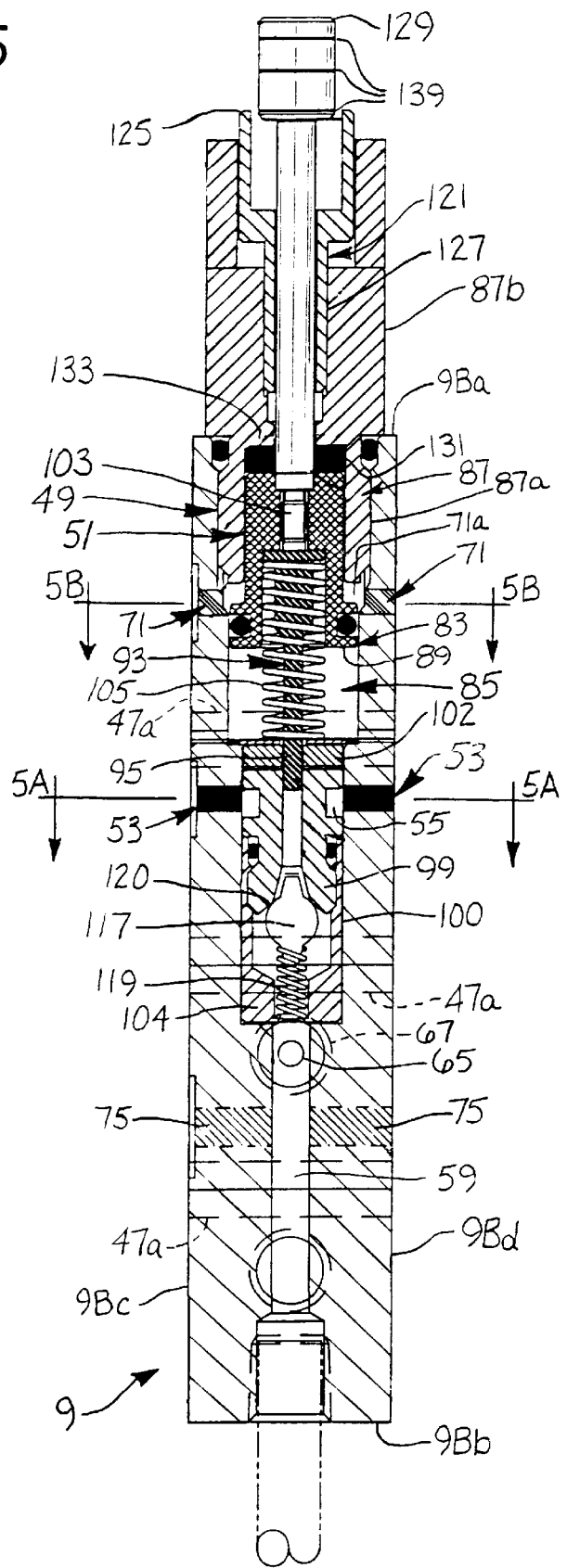
FIG. 5 is an enlarged fragment of FIG. 3 showing one of the injectors illustrated in FIG. 3, being a view in section taken generally on line 5—5 of FIG. 4.
Figure 5B:
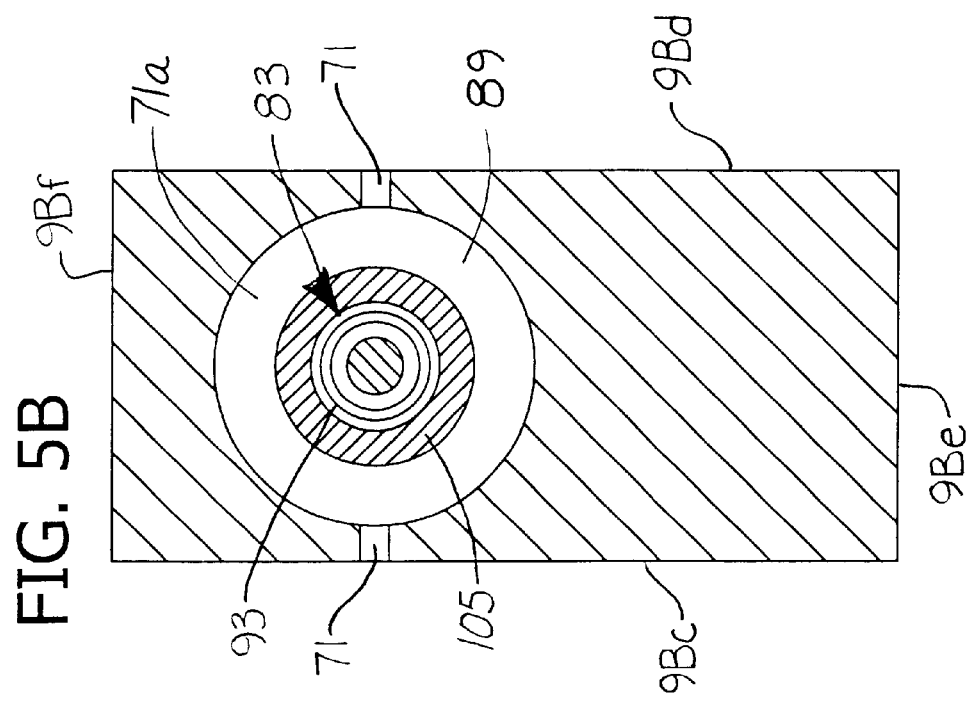
FIGS. 5A and 5B are enlarged sections taken generally on lines 5A—5A and 5B—5B, respectively, of FIG. 5.
Figure 5A:
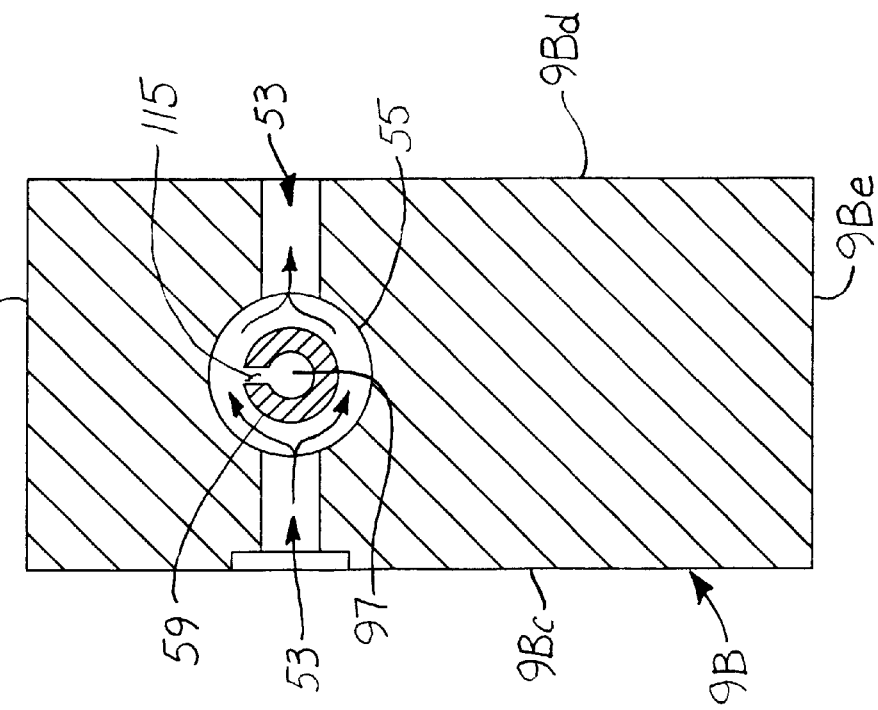

Referring principally to FIGS. 4 and 5, each injector module block 9B is shown as having a recess generally designated 49 extending down from the upper end 9Ba thereof. Fitted in this recess is an air-operated positive displacement expansible chamber device 51, specifically a plunger pump device. A lubricant supply passage designated 53 in its entirety (see also FIG. 5A) extends from one side 9Bc of each block 9B to the other side 9Bd having a central annular section 55 for delivery of lubricant from the supply 5 to the expansible chamber device 51 (plunger pump). The lubricant supply passages 53 of the blocks 9B of the modular injectors 9 are in end-to-end communication with one another and combine to constitute a lubricant manifold 57 (see FIG. 3) extending through the assembly 7 for receiving lubricant and charging the devices (pumps) 51 therewith. A lubricant exit or delivery passage 59 extends from each expansible chamber device (pump) to a first outlet 61 at the lower (exit) end 9Bb of the respective block 9B, the outlet 61 being adapted for connection of the aforementioned lubricant delivery line 19 (FIG. 2) for delivery of lubricant to a dispenser (e.g., nozzle 17) at a point of lubrication. The lubricant exit passage 59 has a lateral extension 65 with a second outlet 67 at the front 9Be of the block 9B to provide a different lubricant exit configuration. Either lubricant outlet 61, 67 can be used, depending on the needs and desire of the user. The outlet not used as a lubricant exit can either be plugged (as shown in phantom at 69 for outlet 67) or used for mounting a sensor to monitor the flow of lubricant in the exit passage 59 and to signal if there is an unexpected interruption in flow.

A first air passage 71 (an injector air passage) extends from one side (9Bc) of each injector block 9B to the opposite side (9Bd) of the block for receiving operating air and delivering it to the expansible chamber device 51, the first (injector) air passages 71 of the injector blocks 9B being in end-to-end communication with one another and constituting a first (injector) air manifold 73 extending through the assembly 7 to the end block 37 (which closes its right end) for receiving pressurized air and delivering it for operating the injectors 9. The air passage 71 in each injector block 9B has a central annular section indicated at 71a (see FIG. 5B). Each injector block 9B further has a second air passage 75 (an aerifying end passage) for receiving air and delivering it to aerify lubricant delivered by the expansible chamber device 51. The second (aerifying) air passages 75 of the injector blocks 9 are in end-to-end communication with one another and constitute a second air manifold 77 (see FIG. 3) extending through the assembly 7 to the end block 37 (which closes its right end). As shown best in FIGS. 4 and 5, the second (aerifying) air passage 75 in each injector module 9 comprises a bore extending transversely through the block 9B from the one side 9Bc to the opposite side 9Bd, a first exit bore 79 extending from the transverse bore 75 to the second (exit) end of the block (its end 9Bb), and a second exit bore 81 extending from the first exit bore 79 to the front 9Be of the block 9B to provide a different aerifying air exit configuration. The exit bore (79, 81) not in use can either be plugged or used to mount a sensor for monitoring the supply of air through the air passage 75. FIG. 4 shows the exit bore 81 plugged as indicated at 82 in phantom. In either event, the exit bore 79, 81 through which aerifying air is supplied is adapted for connection to the aforementioned aerifying air delivery line 20 (FIG. 2) for delivery to a dispenser (e.g., nozzle 17) at a point of lubrication where the air is combined with lubricant and dispensed (e.g., sprayed) on the component to be lubricated.

As best illustrated in FIGS. 4–8, the positive displacement expansible chamber device 51 (plunger pump) in block 9B of each injector 9 comprises a piston 83 mounted for reciprocation in a cylinder 85. At 86 is indicated a vent extending from the chamber below the piston (from the lower end of the cylinder 85) to the front 9Be of the block 9B. A tubular plug 87 has a lower part 87a threaded in the recess 49 at the upper end 9Ba of the block 9 and an upper part 87b above the block. The piston 83 is slidable in the tubular plug 87 and has a head 89 at its lower end below the lower end of the plug 87 with packing 91 for sliding sealing engagement in the cylinder 85. The piston 83 carries a plunger 93 (the pump plunger) having a forward (lower) portion 95 extending forward (down) from the piston into a lubricant chamber 97 in an insert 99 received in a lower part of the recess 49, and an elongate rearward portion 101 (a rod) extending rearward (up) from the piston and projecting up out of the block 9B. The two portions 95, 101 of the plunger 93 are attached to one another by a threaded connection 103 (FIG. 4) and are affixed to the piston 83 so that the piston and entire plunger are movable up and down as a unit. The piston 83 and plunger 93 are biased toward a retracted (upper) position (FIGS. 4 and 6) by a spring 105 surrounding the forward portion 95 of the plunger 93 reacting at its upper end against the lower end of piston 83 with its lower end engaging a washer 107 bearing against an internal shoulder 109 in the recess 49.

The recess 49 which receives the plug 87 extends down from the top of the block 9B to the upper end of cylinder 85 (with which it is coaxial). Extending down from the lower end of the cylinder 85 in coaxial relation thereto and in continuity therewith is an elongate recess 100 which receives the insert 99. At 102 is indicated an annular seal between washer 107 and the upper end of the plug 99. And at 104 is indicated a check valve retainer (for check valve 117) occupying the recess 100 between the plug 99 and the lower end of the recess 100. The lubricant exit or delivery passage 59 extends down from the lower end of recess 100 to the lower end of the block 9B, the arrangement being such that passage 59 is adapted to receive lubricant from the check valve retainer 104.

Figure 6:
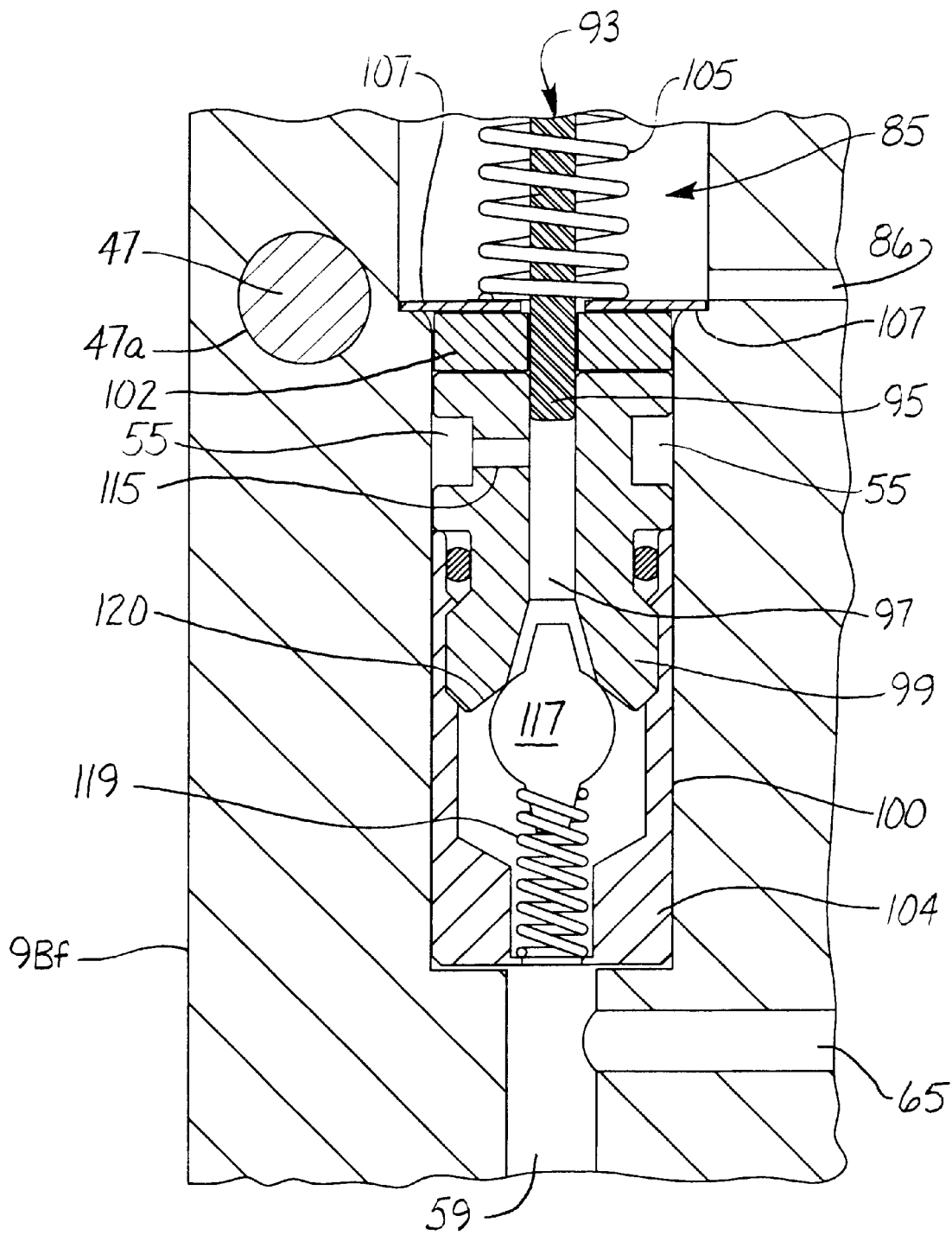
FIG. 6 is generally an enlarged fragment of FIG. 4.
Figure 7:
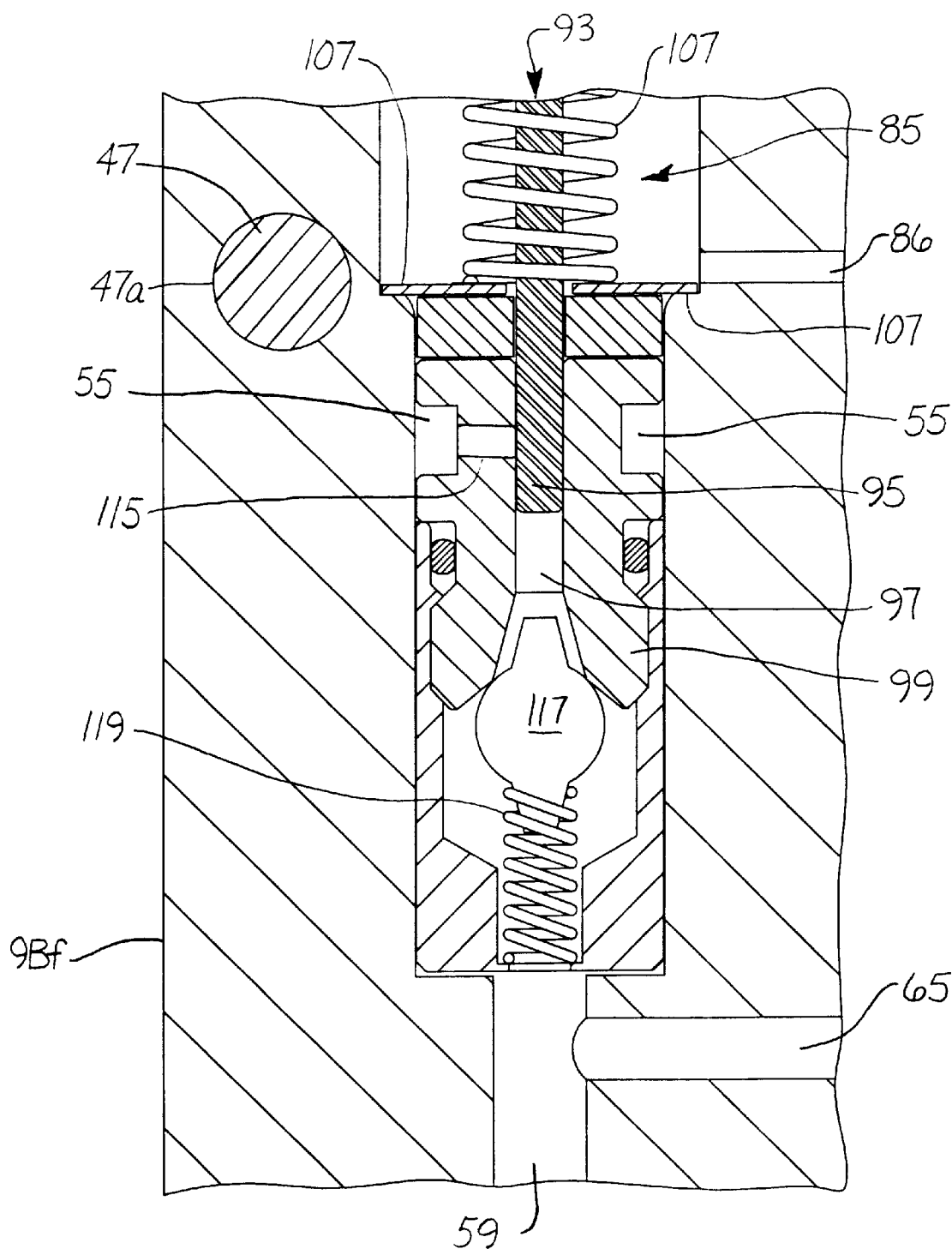
FIG. 7 is a view corresponding to FIG. 6 but showing a moved position of one of the parts.
Figure 8:
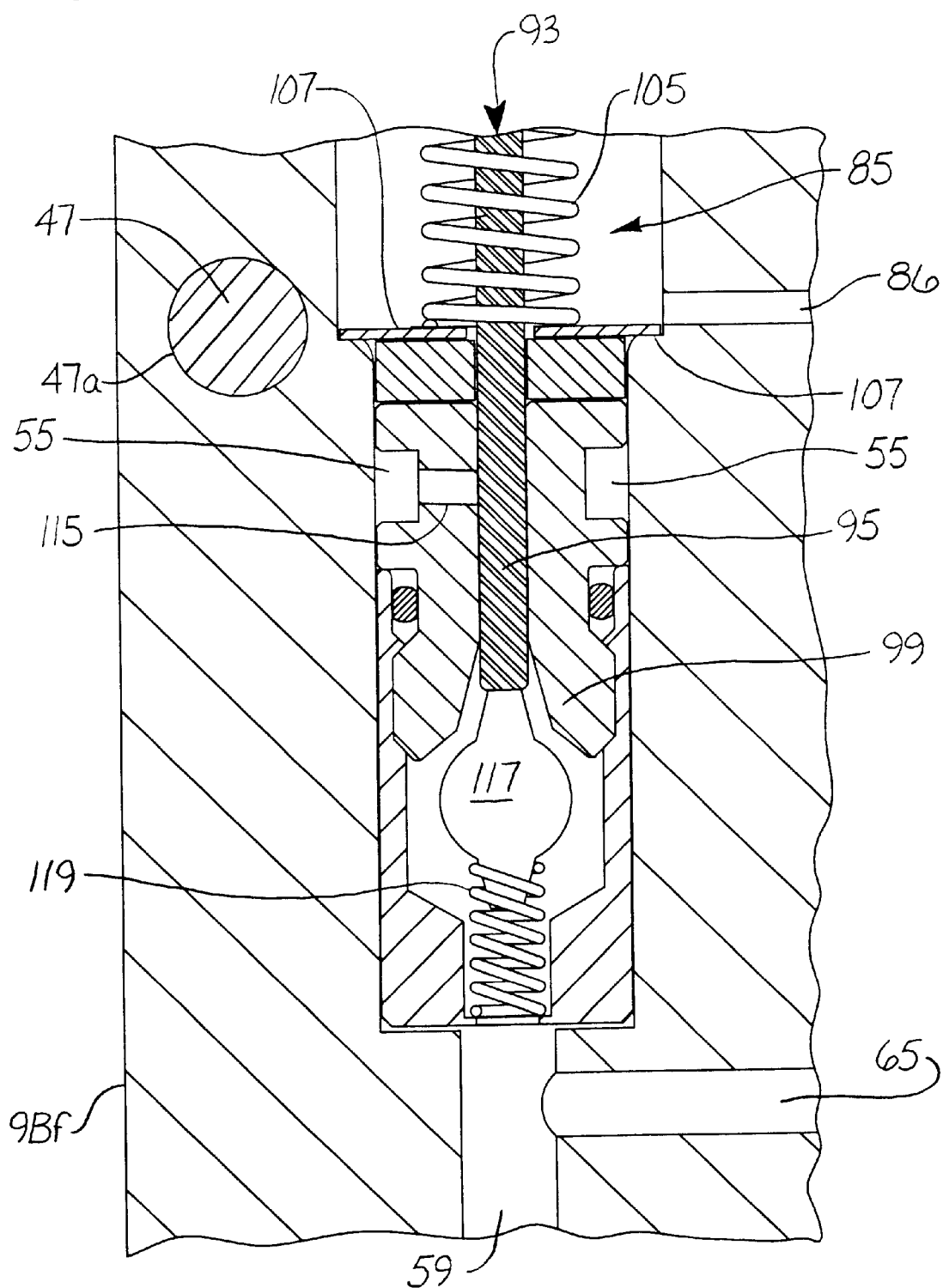
FIG. 8 is a view corresponding to FIG. 7 but showing a further moved position of said one of the parts and a moved position of another part.

The aforesaid central annular section 71a of the injector operating air passage 71 is located between the lower end of the plug 87 and the head 89 of the piston 83, the arrangement being such that injector operating air (when supplied) drives the piston 83 and plunger 95 down. Lubricant then enters the lubricant chamber 97 from the annular section 55 of passage 53, said section being defined by an annular groove also designated 55 in the insert 99, in communication with the lubricant supply passage 53 in the block 9B, entering via a radial port 115 in the insert 99 providing communication between the section or groove 55 and the lubricant chamber 97. The arrangement is such that when injector operating air enters the annular central section 71a of passage 71, the piston 83 and plunger 93 are forced down against the bias of the spring 105 to move through a forward (downward) stroke in which the forward (lower) end of the plunger 93 ejects a charge of lubricant from lubricant chamber 97 past a spring-biased check valve 117 and through the lubricant exit passage 59 for exit through the selected outlet 61, 67. See FIGS. 4, 5 and 6 showing the plunger in its retracted (uppermost) position and FIGS. 7 and 8 illustrating its downward movement. The spring biasing the check valve is indicated at 119. The lower end of insert 99 is formed as a seat for the check valve as indicated at 120. Following ejection, the supply of operating air ceases, and the piston 83 and plunger 93 return to their original retracted position (shown in FIGS. 4, 5 and 6) under the bias of spring 105, retraction of the plunger causing a fresh charge of lubricant to be drawn into the lubricant chamber 97 from groove 55 via port 115.

The length of the stroke of the piston 83 and plunger 93 is adjustable for varying the amount of lubricant dispensed during each cycle of operation. As shown in FIGS. 4, 5 and 9–11, this adjustment is achieved by means of a tubular adjusting screw 121 threaded down into a bore 123 extending down through the upper part 87b of the plug 87 aligned with the cylinder 85 in the injector block 9B.

Figure 9:
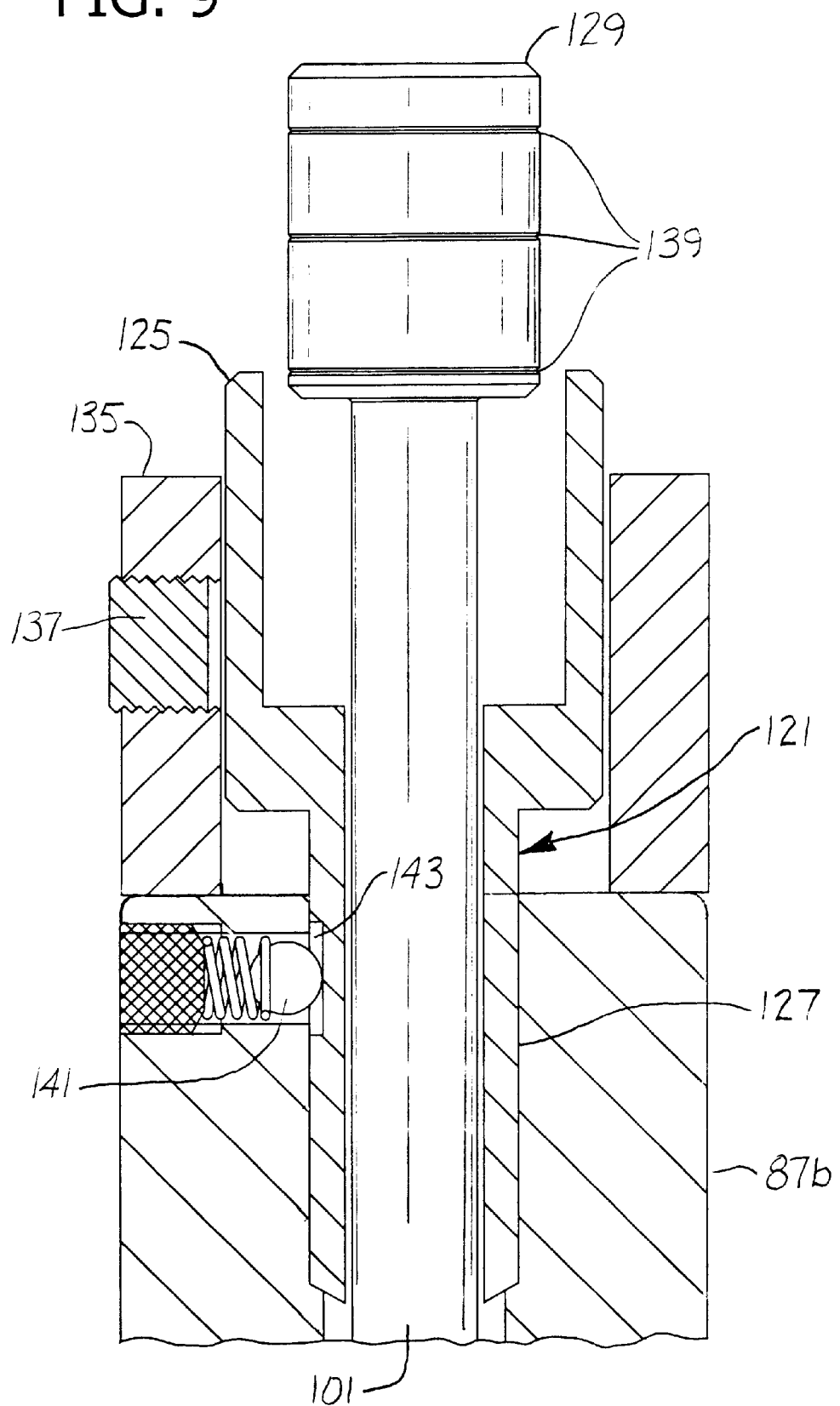
FIG. 9 is an enlarged fragment of FIGS. 3 and 4.
Figure 10:
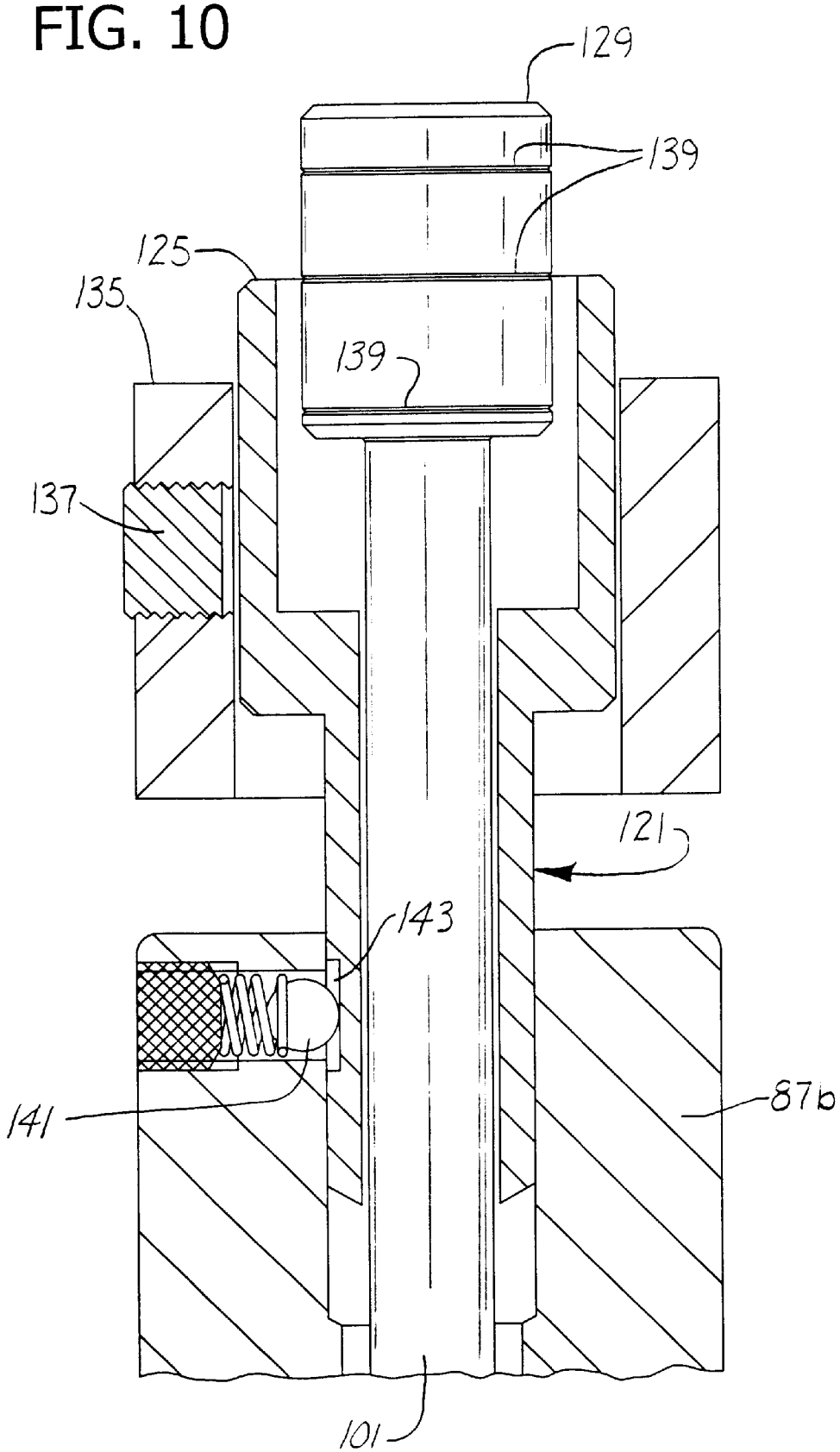
FIG. 10 is a view corresponding to FIG. 9 but showing a moved position of parts.
Figure 11:
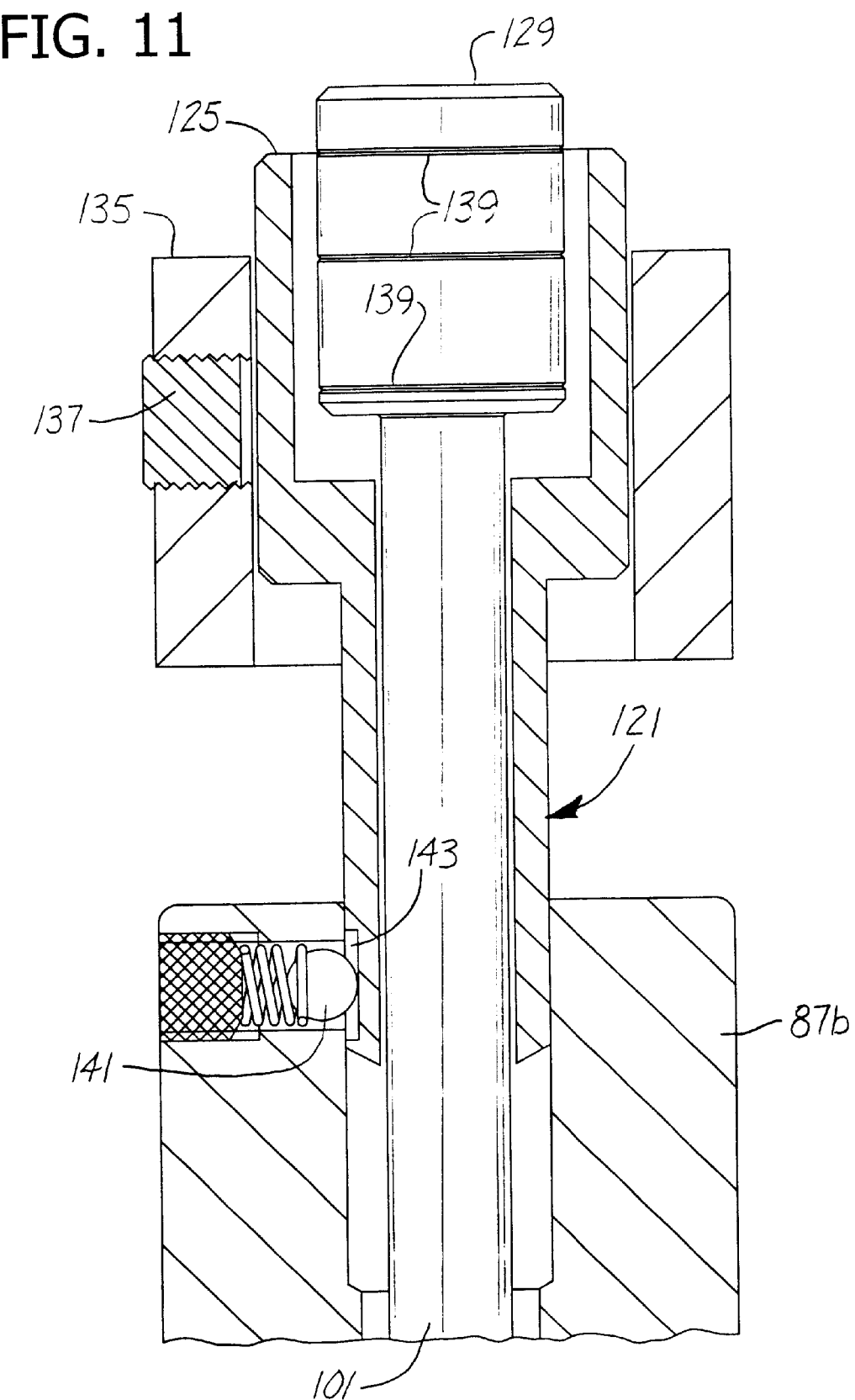
FIG. 11 is a view corresponding to FIG. 10 showing a further moved position of parts.

The adjustment screw 121 has a cup-shaped head 125 and a tubular shank 127 in which portion 101 of the plunger 93 is slidable. A stop 129 mounted on the rearward (upper) end of portion 101 of the plunger 93 is engageable with the bottom of the cup-shaped head 125 to limit the forward (downward) travel of the piston 83 and the plunger 93. The rearward (upward) travel of the piston/plunger 83/93 is limited (for determining their fully retracted position) by the engagement of the piston 83 with a seal 131 (FIGS. 4 and 5) in the lower part 87a of plug 87 seated against a shoulder 133 in the lower part at its upper end. By threading the adjustment screw 121 in or out relative to the plug 87 (which is immovable relative to the injector block 9B), the length of the stroke of the piston 83 and plunger 93 can be adjusted as needed. However, an annular stop collar 135 secured in fixed position around the head 125 of the screw 121 (e.g., by a set screw 137) is engageable with the upper end of the upper part 87b of plug 87 to limit the extent to which the adjustment screw 121 can be threaded into the plug, thereby limiting the maximum range of forward (downward) travel of the piston 83 and plunger 93 to the "prime" position shown in FIG. 8 in which the plunger 93 extends sufficiently forward (downward) in the lubricant chamber 97 to unseat the check valve 117 and thus purge any air which may be in the lubricant chamber 97. The stop 129 mounted on the plunger 99 has various line markings 139 thereon which are adapted to line up with the upper end of the cup-shaped head 125 of the adjusting screw 121 to indicate various stroke lengths. FIGS. 9–11 show various adjusted positions as indicated by the line markings 139. Once the adjustment screw 121 has been moved to the desired position, it can be locked in position by a spring-biased detent 141 received in one of a plurality of recesses such as indicated at 143 in the screw.

Figure 12:
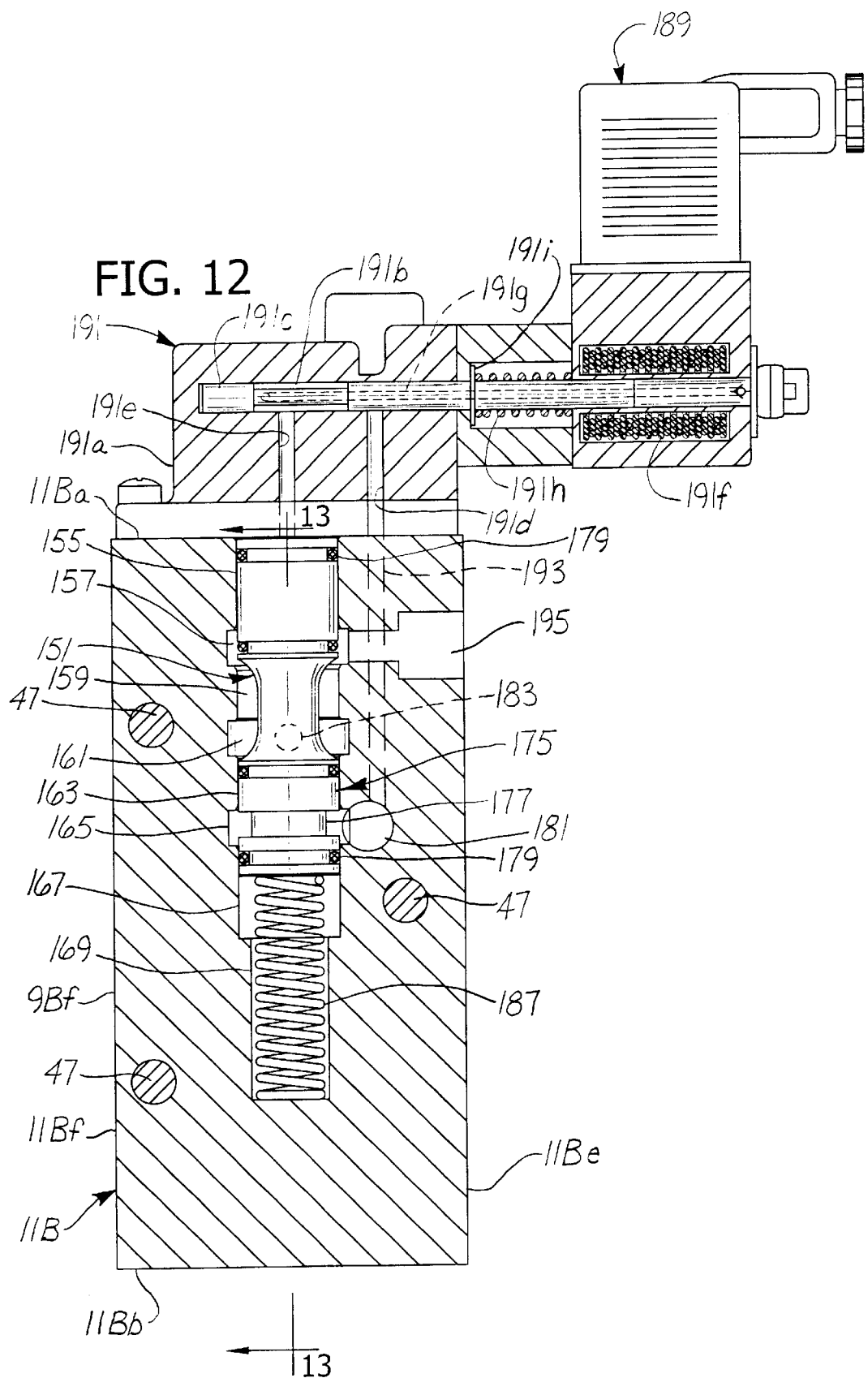
FIG. 12 is a view generally on line 12—12 of FIG. 3 showing a valve in section from adjacent the top down.
Figure 13:
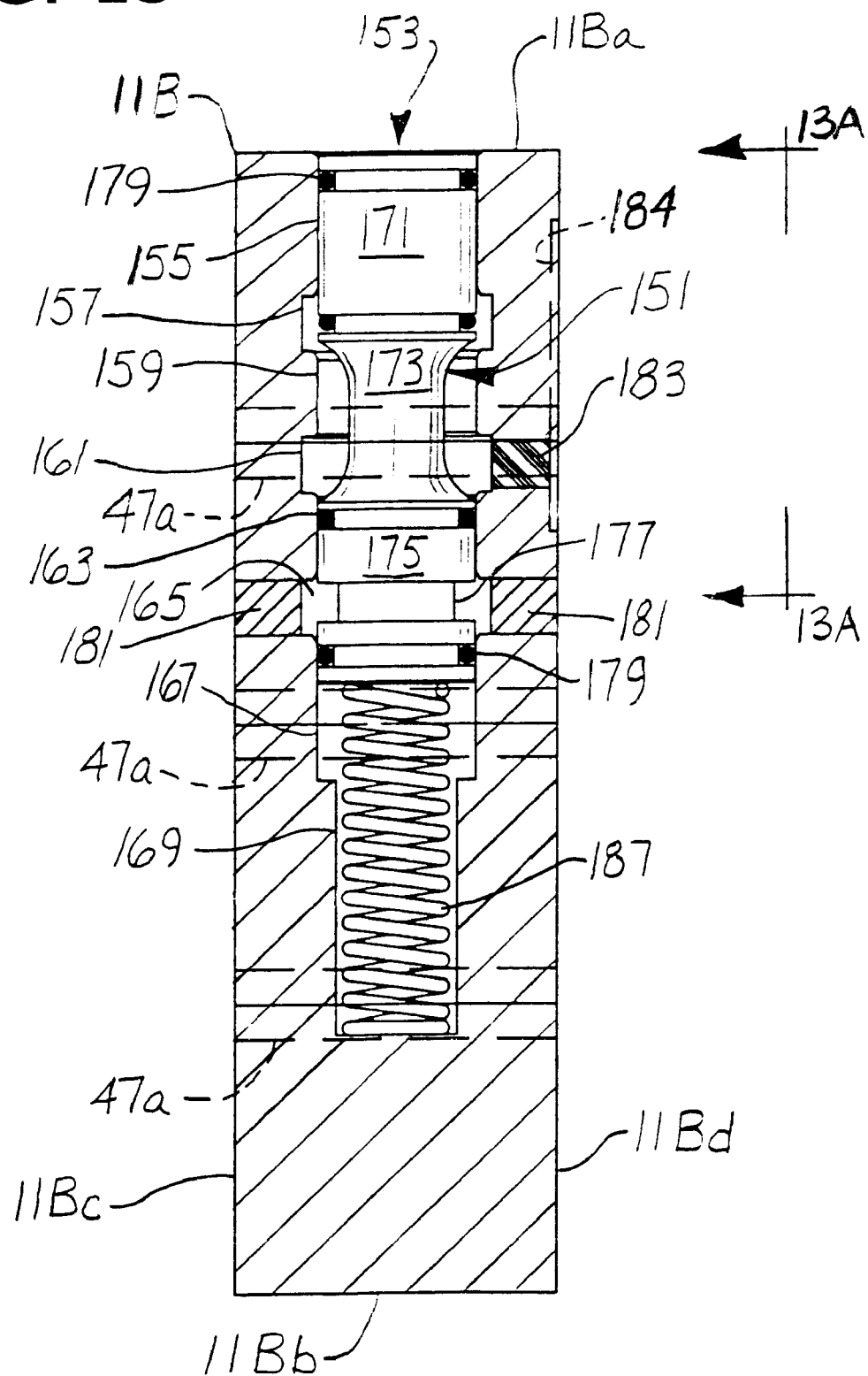
FIG. 13 is a view of the FIG. 12 valve in section generally on line 13—13 of FIG. 12.
Figure 14:
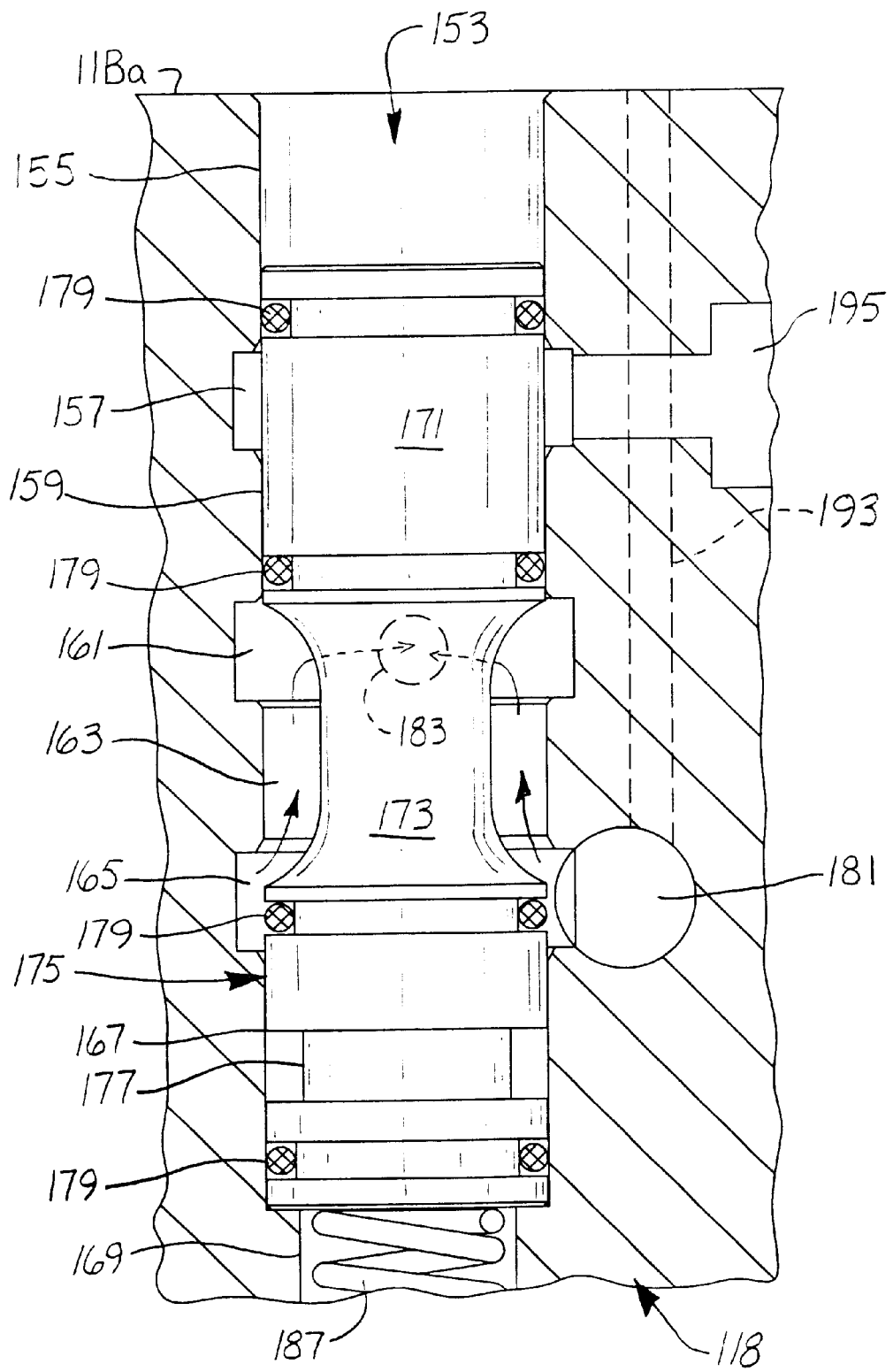
FIG. 14 is an enlarged fragment of FIG. 12.

Referring principally to FIGS. 12–14, the first valve module 11 (the injector air module) comprises a valve body or block 11B having a valve generally designated 151 slidable in a bore or cylinder 153 extending down from the top 11Ba thereof. The bore or cylinder 153, in order from the top down, has an upper (first) section 155, a first annular enlargement or groove 157, a second section 159, a second annular enlargement or groove 161, a third section 163, a third annular enlargement or groove 165, a fourth section 167 and a fifth (lowermost) section 169 of reduced diameter with respect to the first four sections. The valve 151 comprises a piston 171 slidable in the upper section 155 of the bore or cylinder 153, a spool 173 below the upper section 171 and a lower section 175 below the spool having an annular groove 177. An O-ring seal is indicated at 179. At 181 is indicated an inlet air passage which extends completely through the block 11B from its left side 11Bc to its right side 11Bd tangentially intersecting annular groove 165. At 183 is indicated an outlet air passage (injector air passage) extending transversely of the block 11B, from the annular groove 161 to an elongate angled recess or groove 184 in the side 11Bd (the right side) of the block 11B which is in engagement with the left side of the adjacent valve module 13. The end module 35 is held in sidewise engagement with the block 11B with the air inlet 39 therein in communication with the left end of the inlet air passage 181 for supplying air under pressure to passage 183. The valve 151 is movable in the bore or cylinder 153 between the raised retracted position (which is its closed position) in which it is shown in FIGS. 12 and 13 wherein it blocks the upward flow of air from passage 181, and the initial lowered position (a transitory position) in which it is shown in FIG. 14 wherein air is enabled to flow up from passage 181 through the groove 165, section 163 of the cylinder 153 around the spool 173, and through groove 161 to passage 183. The valve 151 is biased upward to its retracted (closed) position by a coil compression spring 187 in section 169 of the bore 153 reacting from the lower end of section 169 against the lower end of the valve. It is movable down to open position against the bias of spring 187 by operation of a solenoid 189 to trigger a conventional pilot valve 191 to deliver air under pressure into the upper end of the upper section 155 of the bore or cylinder 153 for driving the piston 171 down, thereby driving the entire valve 151 down. The solenoid 189 and pilot valve 191 combination is a conventional combination, e.g. a unit purchased from IMI Norgren through its sales office in Elk Grove Village, Ill., manufactured by Norgren Valve Division, Littleton, Colo. The air for delivery by the pilot valve is delivered from air passage 181 (when it receives air) via a passage 193 extending up to the pilot valve from passage 181 in the block 11B.

As shown in FIG. 12, the pilot valve 191 comprises a multi-piece valve body 191a, a cylinder bore 191b in the body, a spool valve 191c movable in the bore 191b, a first passage 191d in the valve body providing communication between passage 193 and the bore 191b, and a second passage 191e in the valve body providing communication between the bore 191b and the upper section 155 of the bore 153 above the piston 171. The pilot valve 191 also includes a winding 191f which is energizable to move the spool valve 191c in the bore 191b from a first position (shown in FIG. 12) in which flow through the passage 191d (and passage 193) is blocked by the spool valve and in which the upper section 155 of the bore 153 above the piston 171 is vented via passage 191e and a vent passage 191g in the body 191a of the pilot valve, to a second position (not shown) in which the vent passage 191g is blocked and the passage 193 communicates with the upper section 155 of the bore 153 via passage 191d, bore 191b and passage 191e. In this second position, pressurized air drives the piston 171 down against the spring 187 until the air driving it down is exhausted via an exhaust port 195 extending from groove 157 to the front 11Be of the block 11B. As the valve 151 moves down, it passes through the open position shown in FIG. 14, continuing being open until the exhaust of air via port 195, at which time the valve 151 moves back up under the force of spring 187 until it once again closes the port 195 and the force of the spring 187 is overcome by the air pressure in the upper section 155 of the bore. The cycle then repeats and continues to repeat to deliver intermittent pulses of pressurized air to the injector modules 9 until such time as the winding 191a is de-energized, as when the system is shut off. De-energization of the winding causes the spool valve 191c to move back to its original (venting) position under the force of a return spring 191h acting against a flange 191i on the spool valve.

Figure 15:
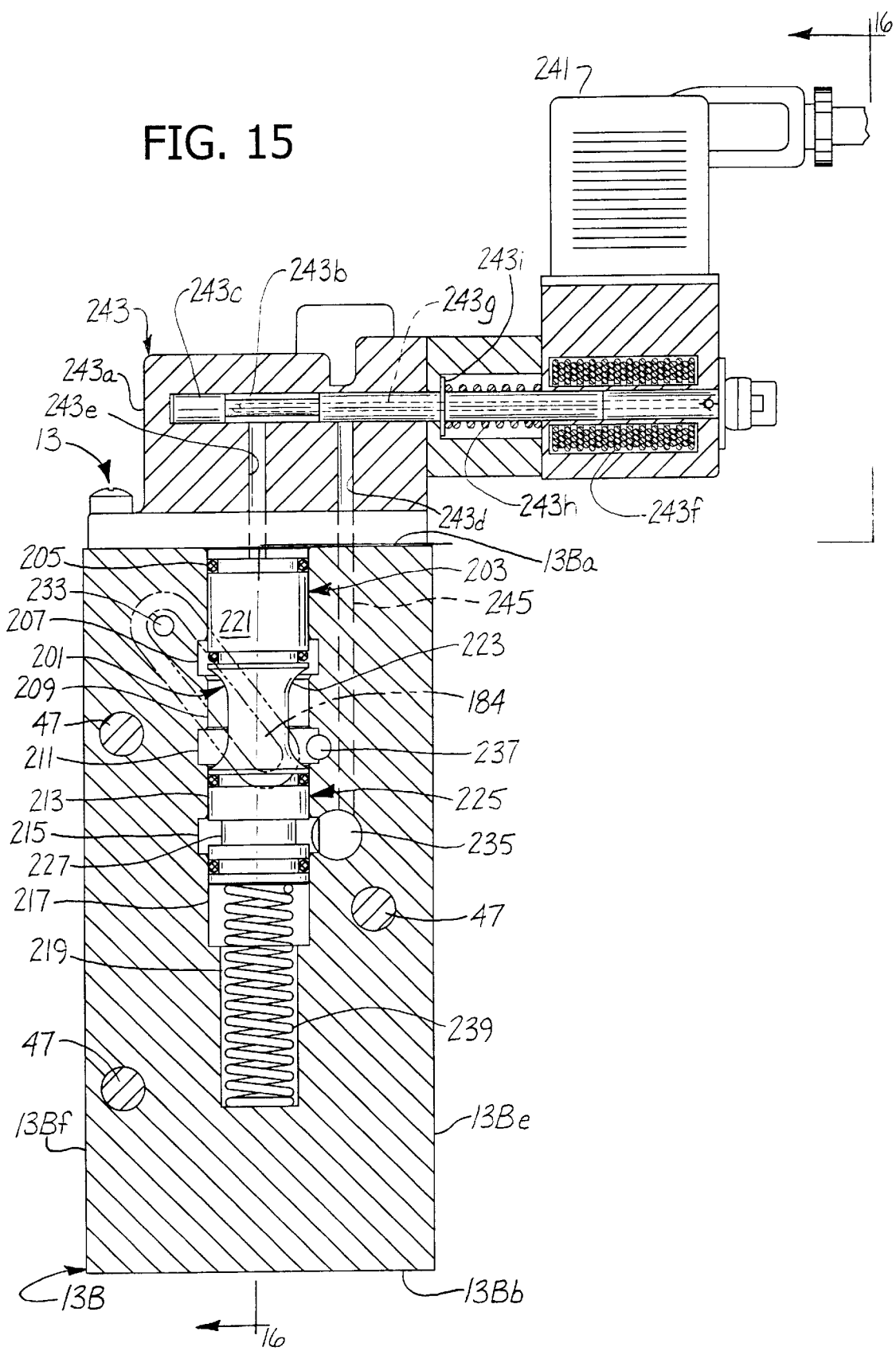
FIG. 15 is a view generally on line 15—15 of FIG. 3, showing a valve for the nozzle air module, in section from adjacent the top down.
Figure 16:
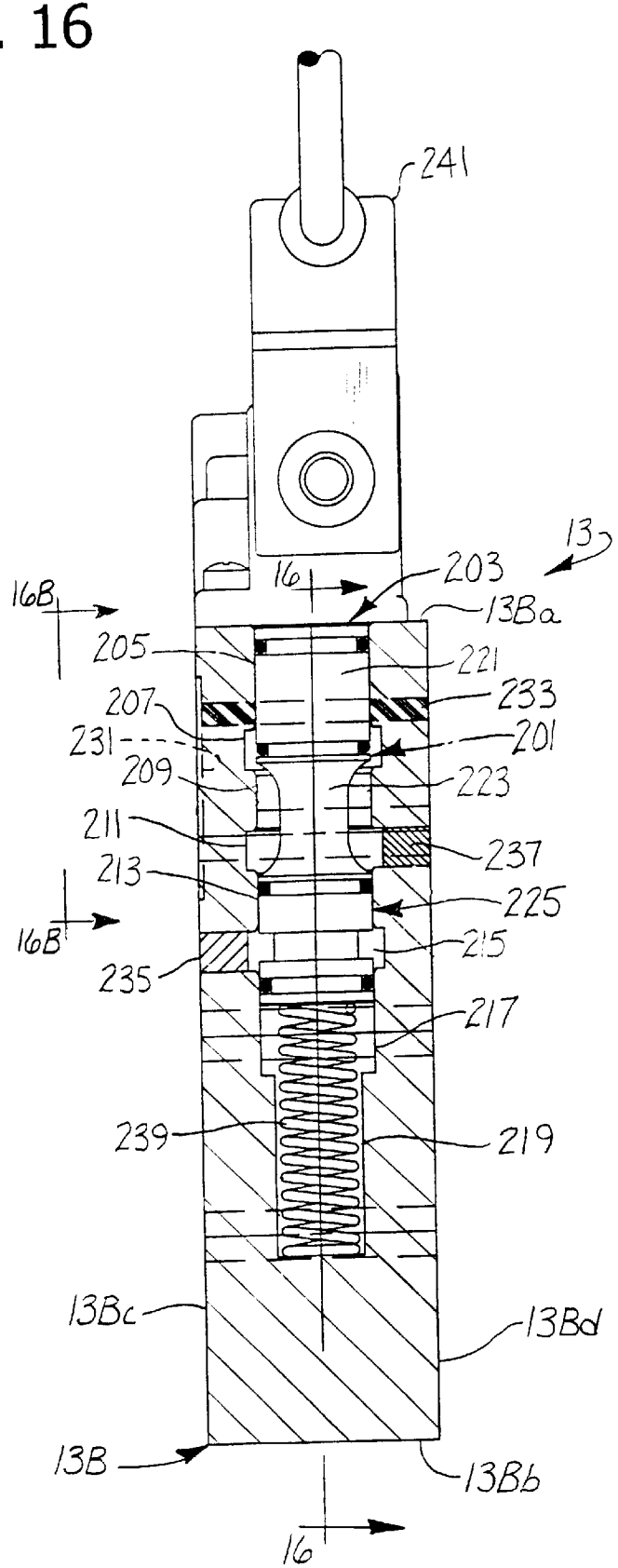
FIG. 16 is a view of the FIG. 15 valve taken generally on line 16—16 of FIG. 15 (mainly in vertical section)
Figure 16B:
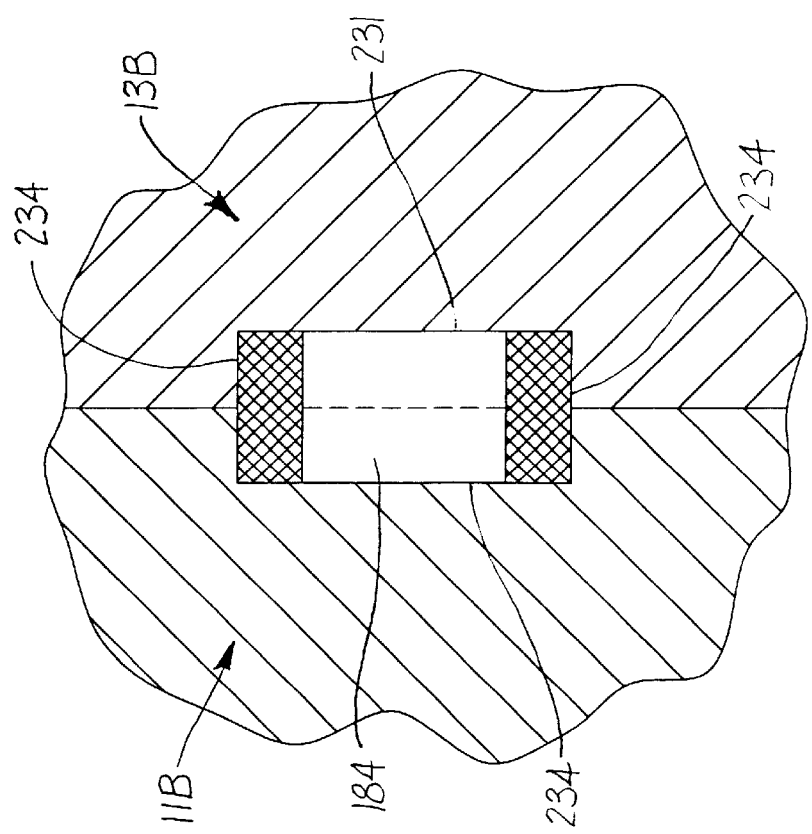
FIG. 16B is a fragmentary section showing an air passage.
Figure 16A:
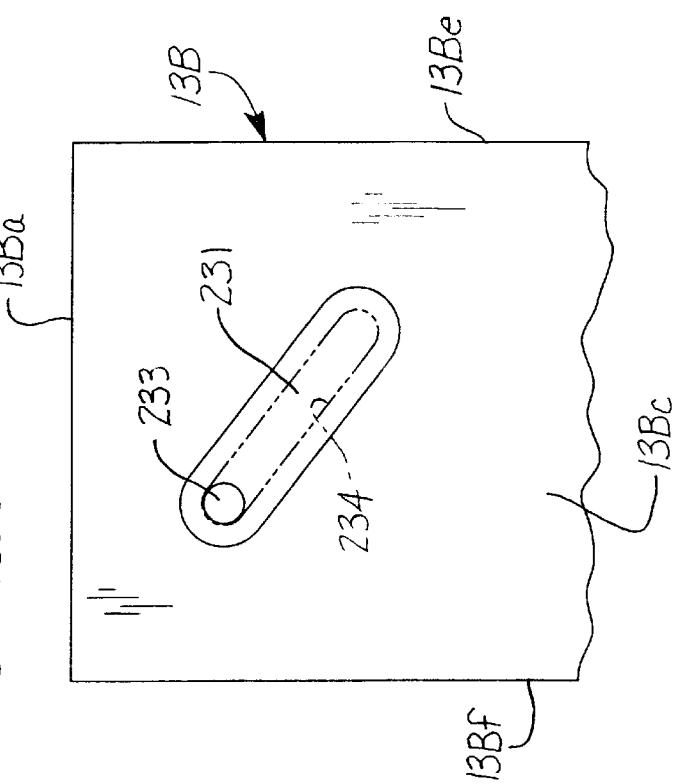
FIG. 16A is a fragmentary view on line 16A—16A of FIG. 15.

Referring principally to FIGS. 15 and 16, the second valve module 13 (the aerifying or nozzle air module) comprises a body or block 13B having a valve 201 slidable in a bore or cylinder 203 extending down from the top 13Ba thereof. The bore or cylinder 203, in order from the top down, has an upper (first) section 205, a first annular enlargement or groove 207, a second section 209, a second annular enlargement or groove 211, a third section 213, a third annular enlargement or groove 215, a fourth section 217 and a fifth (lowermost) section 219 of reduced diameter with respect to the first four sections. The valve 201 comprises a piston 221 at its upper end slidable in the upper cylinder section 205, a spool 223 below the upper section 221, and a lower section 225 below the spool having an annular groove 227. Packing for valve 201 is indicated at 229. The second valve module 13 as thus far described is similar to the first valve module 11. The block 13B of module 13 has an angled air-receiving elongate recess or groove 231 in the left side 13Bc thereof (see FIG. 16A) and an air passage 233 for injector air extending transversely all the way through the block from the recess 231 to the right side 13Bd of the block. This passage 233 extends from adjacent the upper end of the recess 231 in front of the bore or cylinder 203.

The angled groove 231 mates with the angled groove 184 (similarly formed) in the right side of block 11B thereby forming an air passage 184/231 (FIG. 16B) in communication with the right end of the air passage 183. An oval (racetrack) shaped seal 234 is provided in the grooves 184/231. Air is delivered from the air passage 233 to the air pressure regulator 15 (the left side of which is in engagement with the right side 13Bd of valve module block 13B), by-passing the cylinder 203. At 235 (FIG. 16) is indicated an air passage (aerifying or nozzle air passage) extending transversely of the block 13B from its left side 13Bc to the annular groove 215 and at 237 is indicated an air passage extending transversely of the block 13B from the annular groove 211 with which it is generally tangent to the right side 13Bd of the block which is in engagement with the left side of the air pressure regulator 15. The valve 201 is movable between the raised retracted (closed) position in which it is illustrated in FIGS. 15 and 16 wherein it blocks the flow of air from passage 235 to passage 237 and a lowered position (like that of valve 151) wherein air is enabled to flow from passage 235 through the groove 215, section 213 of the cylinder 203, around the spool 223, groove 211 and passage 237. The valve 201 is biased upward to its closed retracted position by a coil compression spring 239 in section 219 of the bore 203 reacting from the lower end of section 219 against the lower end of the valve 201. It is movable down to an open position against the bias of spring 239 by operation of a solenoid 241 to trigger a pilot valve 243 (which may be of the same construction as the pilot valve 191 described above for valve 11, with corresponding parts being identified by the same reference letters in FIG. 15) to deliver air under pressure into the upper section 205 of the cylinder 203 for driving the piston 221 down thereby driving the entire valve 201 down. The air for this movement is delivered from air passage 235 (when it receives air) via a passage 245 extending up to the pilot valve 243 from passage 235 in the block 13B. As the valve 201 moves down, it passes through the open position shown in FIG. 17, continuing being open until the venting of the pilot valve 243. Thus, the construction and operation of module 13 are generally similar to that above described for module 11, except that the valve 201 remains in its open position (without cycling between open and closed positions) to deliver a continuous stream of nozzle air until the winding 243f of the pilot valve 243 is de-energized to vent the upper section 205 of the cylinder 203, as when the system is shut off.

Figure 18:
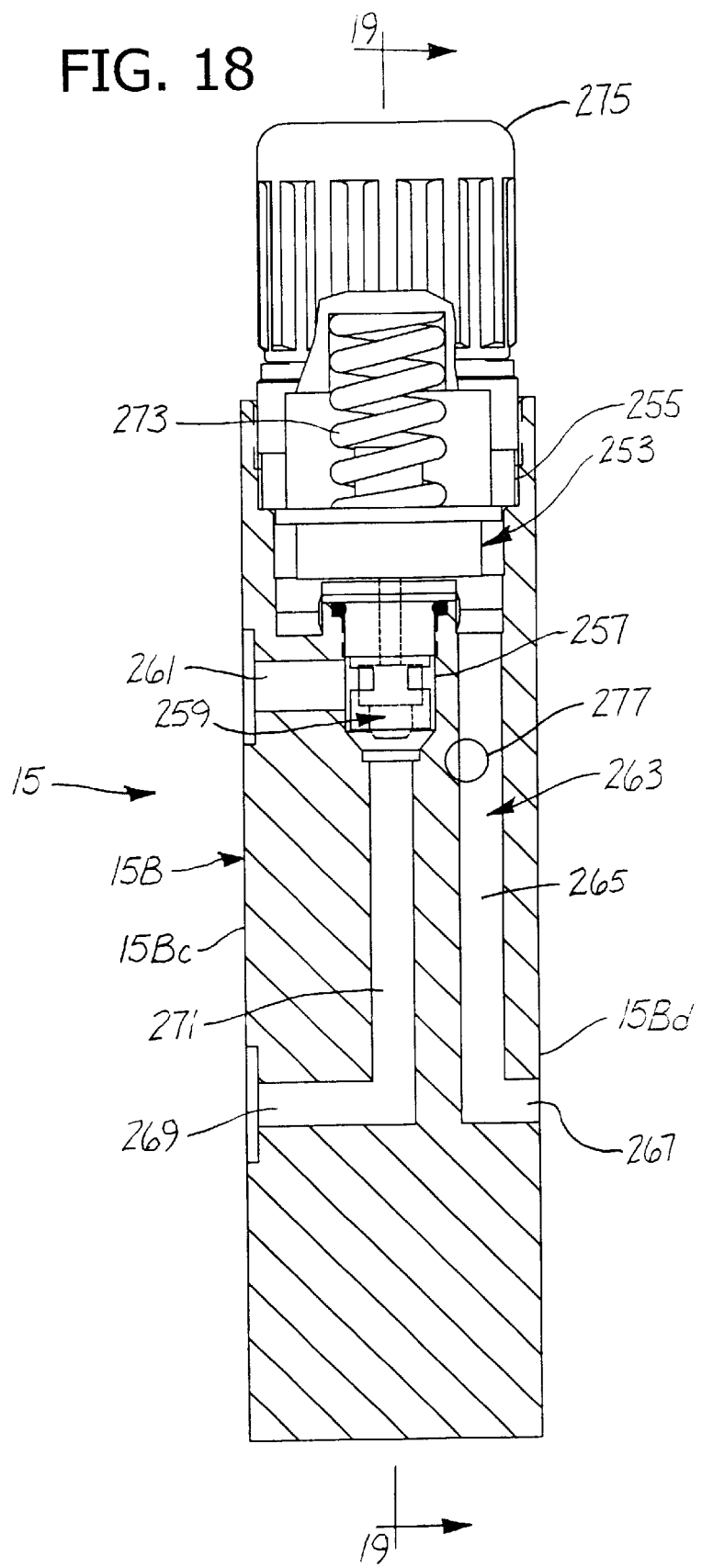
FIG. 18 is generally an enlargement of the view of an air regulator shown in FIG. 3.
Figure 19:
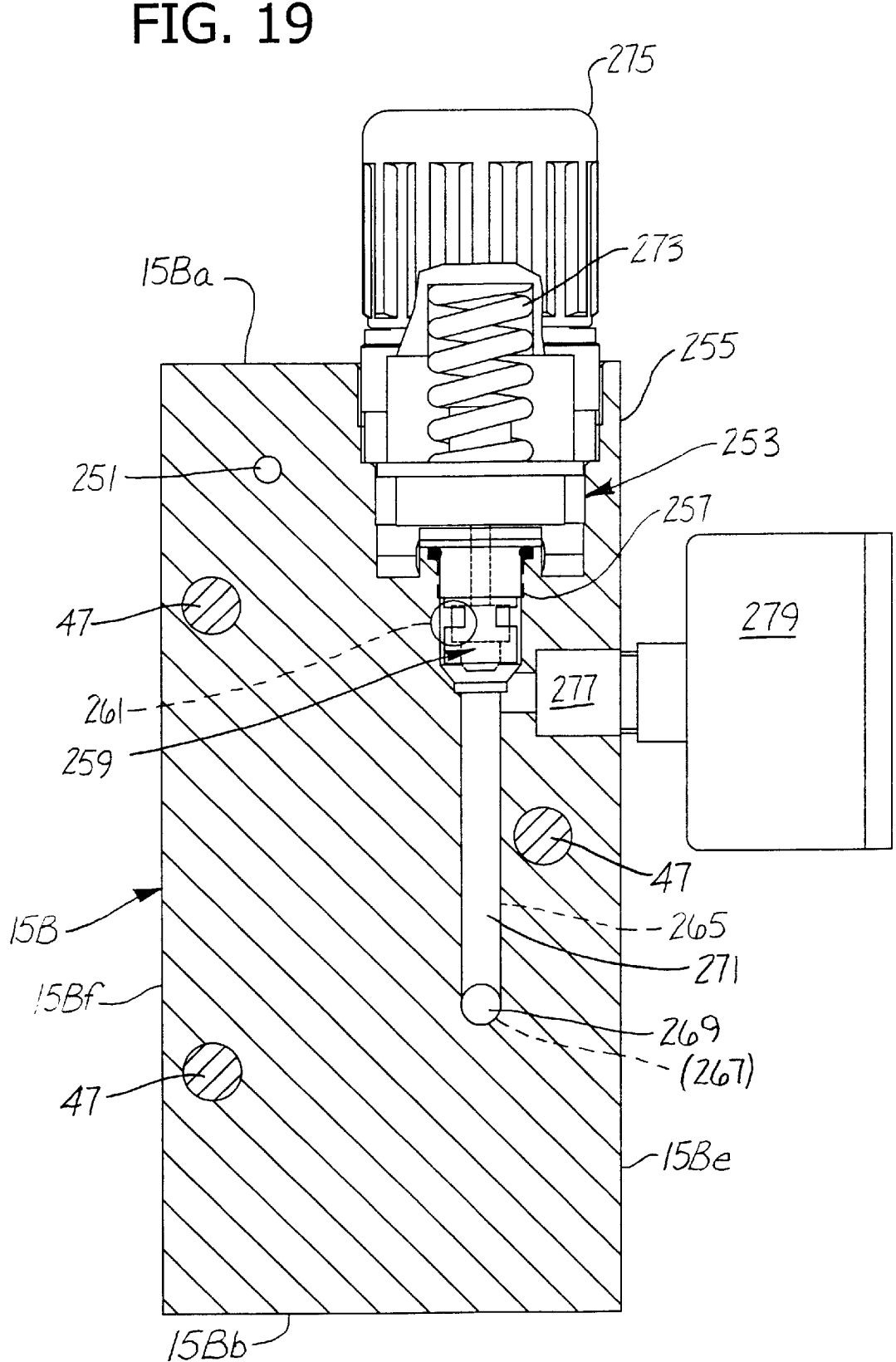
FIG. 19 is a view in section taken generally on line 19—19 of FIGS. 3 and 18.

Referring principally to FIGS. 18 and 19, the air pressure regulator module 15 (which is next to the valve module 13, on the right thereof, in engagement with the right side 13Bd of the valve module block 13B) comprises a regulator body or block 15B having an air passage 251 (see FIG. 19) extending transversely therethrough from its left side 15Bc to its right side 15Bd, which in the assembly 7 lines up with for flow of injector air completely through the block 15B without regulation therein. Block 15B has a recess designated 253 in its entirety in the upper end thereof having an upper section 255 and a lower section 257 of smaller diameter than 255 containing conventional air pressure regulating mechanism 259, specifically commercially available mechanism obtained from Norgren. At 261 is indicated a pressure air input port extending in from the left side 15Bc of the block 15B to the lower section 257 of the recess 253. In the assembly 7, this port 261 lines up with passage 237 in valve module 13 to receive air therefrom for regulation by mechanism 259. The regulated air exits through passaging 263 comprising a vertical section 265 and a horizontal transverse outlet port 267 extending to the right side 15Bd of block 15B. At 269 is indicated another pressure air inlet port which extends in from side 15Bc of the block 15B for delivery of air to a vertical air passage 271 extending up in the block from port 269 to the lower end of the lower section 257 of recess 253. This port 269 and passage 271 are not used in the system 1 but are shown because they are used in a modified version of the system to be described; the port 269 being closed by valve module 13 in system 1. The air pressure regulation mechanism 259 includes spring 273 and adjusting knob 275. At 277 (FIG. 19) is indicated a passage for regulated air extending from the output of the pressure regulating mechanism to a pressure gauge 279 at the front 15Be of the block 15B.

The lubricant inlet module 45 (see FIG. 3) comprises a block 45B having an injector air passage 281 and an aerifying or nozzle air passage 283 extending therethrough from the left side of the block 45B (which is in engagement with the right side 15Bd of the air pressure regulator block 15B) to the right side of the block 45B (which engages the left side 9Bc of the first injector module block 9B). Passage 281 lines up with port 261 in the air pressure regulator block 15B for flow of injector air from passage 261 to the injector air inlet of the first (and successive) injector modules 9. Passage 283 lines up with port 267 in the air pressure regulator block 15B for flow of nozzle air from port 267 of 15B to the nozzle air passage 75 of the first (and successive) injector modules 9. The lubricant inlet module block 45B has upper and lower lubricant inlets 285 and 287. Lubricant passaging 289 and 291 extends from the lubricant inlets 285, 287, respectively, in block 45B to the lubricant passage 53 of the first injector module 9. Only one of the lubricant inlets is used in the system 1 (e.g. 285); the other (not in use) is suitably plugged.

Figure 17:
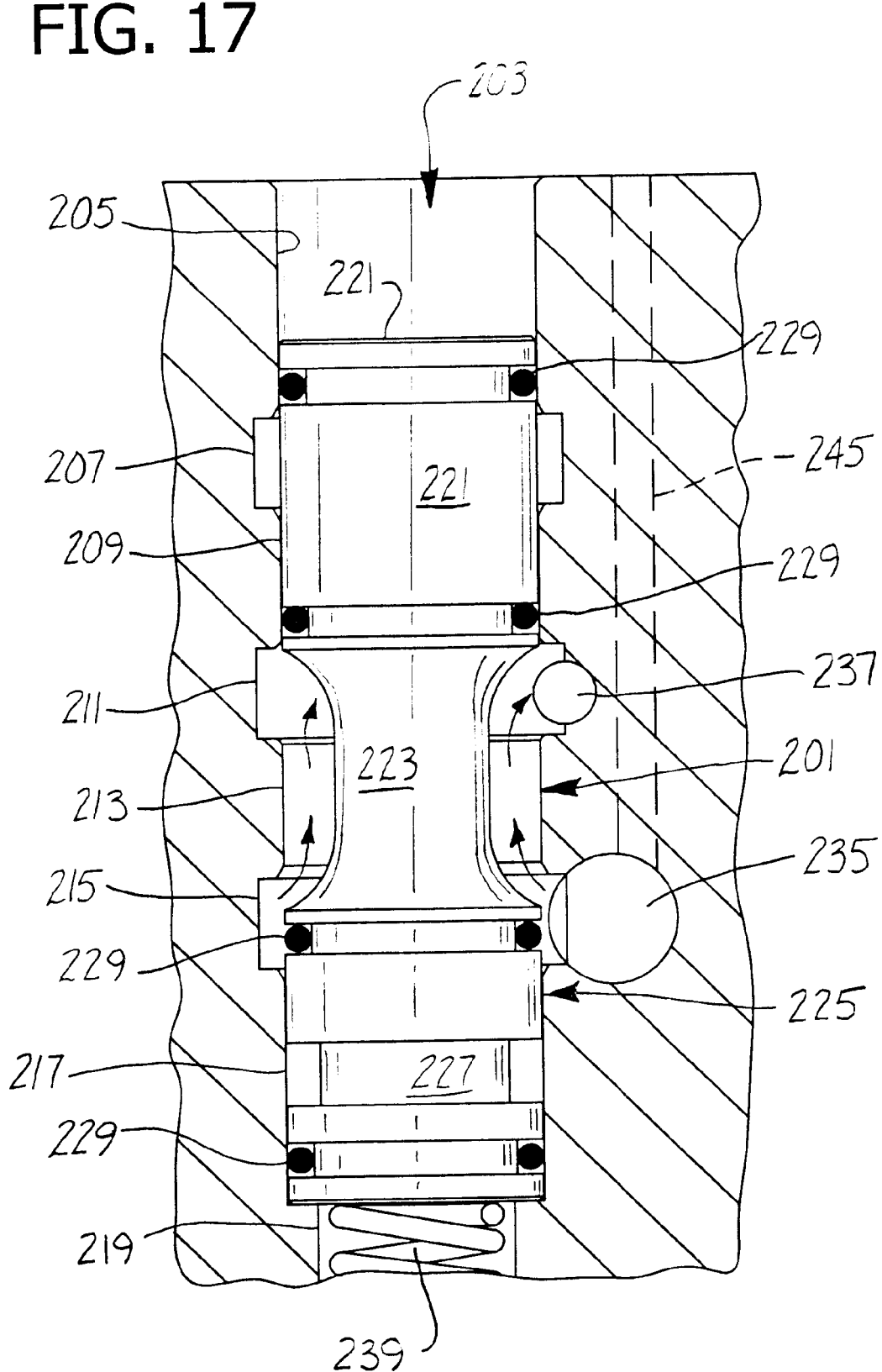
FIG. 17 is an enlarged fragment of FIG. 15.

The controller 31 is operable to effect periodic operation of the solenoids 189 and 241 via wiring indicated at 293 in FIG. 1. On operation of the solenoids, the valves 151 and 201 of the valve modules 11 and 13 are opened to effect operation of the system 1 in a cycle. The solenoids effect opening of the pilot valves 191 and 243, for delivery of air under pressure from the air passages 193 and 245 to the upper end of the upper cylinder sections 155 and 229 to drive the valves 151 and 201 down to open them as shown in FIGS. 14 and 17. Thereupon inlet air from the filter 21 (at 100 p.s.i. for example) flows through filter outlet 25, through port 39 in the left end module 35, the air passage 181 in the first valve module 11, from passage 181 to passage 183 in said first valve module (see the arrows in FIG. 14), then up from 183 in the angled passage 184/231 (see FIG. 16B) formed by the mating recesses 184 (in block 11B) and 231 (in block 13B), through passage 233 extending all the way across the second valve module block 11B, passage 251 extending all the way across the air pressure regulator 15, through passage 281 extending all the way across the lubricant inlet module 45 (see FIG. 3), to the injector air passage 71 of the first injector module 9 and then through the injector air passages 71 of all the rest of the injector modules 9 in the series in assembly 7. Thus, passages 71 together constitute the aforesaid injector air manifold 73 supplying injector air to each injector module 9 for effecting operation of each injector module 9 involving the driving down of the piston 83 and associated plunger 93 thereof to dispense a charge of lubricant (e.g. one or more drops of lubricant depending on the setting of the respective adjustment screw 121). The charge of lubricant thus dispensed by each injector module 9 is delivered via the respective delivery line 19 to the nozzle 17, where it is subjected to a pulse of nozzle air delivered via line 20 for being sprayed upon the respective point of lubrication. The pulse of nozzle air is delivered to the nozzle simultaneously with the delivery thereto of the charge of lubricant as follows.

Inlet air from filter 21 flows through the filter outlet 25, port 39 in the left end module 35, to and through the passage 181 in the first valve module 11, from 181 to port 235 and groove 215 in the second valve module 13, through section 213 of the cylinder 203 (the valve 201 being down and open) to port 237 (see FIG. 17), port 261 (aligned with 237) in the air pressure regulator 15, out of the pressure regulator with its pressure thereby regulated (e.g. to 60 p.s.i.) via 265 and 267, passage 283 in module 45 and then through passage 75 in the first injector module 9 and then through all the rest of the injector modules 9 in the series in assembly 7. The regulated-pressure nozzle air exits from the series of passages 75, which constitutes the nozzle air manifold 77 through outlets 79 thus supplying the nozzle air via lines 20 to the nozzles 17.

As noted previously, the length of the stroke of the plunger 93 (and thus the amount of lubricant ejected from the lubricant chamber during each cycle) can be varied as needed by rotating the adjusting screw 121 to the appropriate setting as indicated by the line marks 139 on the stop 129 at the rearward end of the plunger. Each expansible chamber device 51 (plunger pump) can be "primed" at any time to eliminate possible air in the lubricant chamber by moving the adjustment screw 121 to its "prime" setting for one or more cycles of the device.

Figure 20:
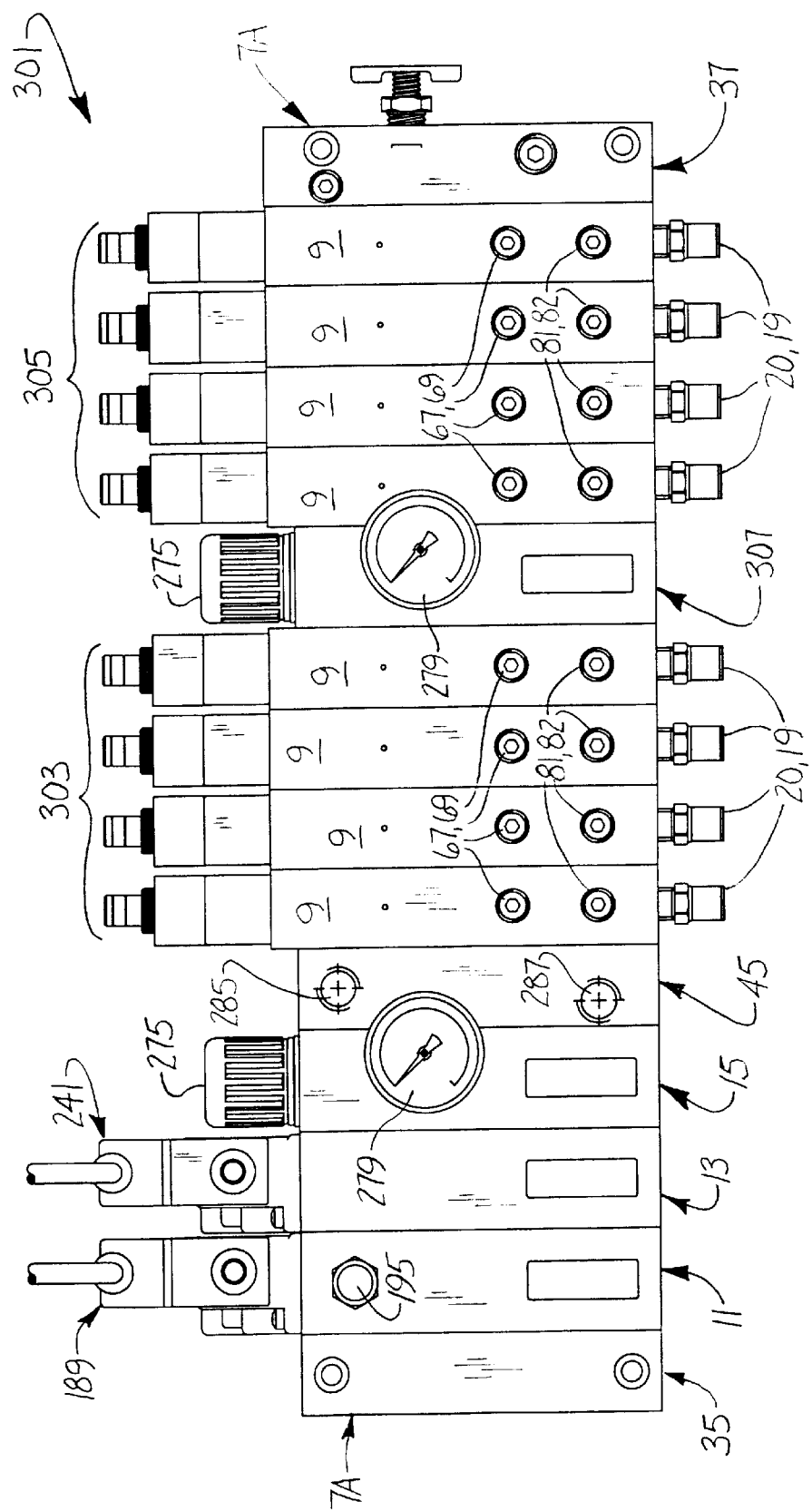
FIG. 20 is a view in front elevation of a modification of the assembly of injectors etc. shown in FIGS. 1 and 3.
Figure 21:
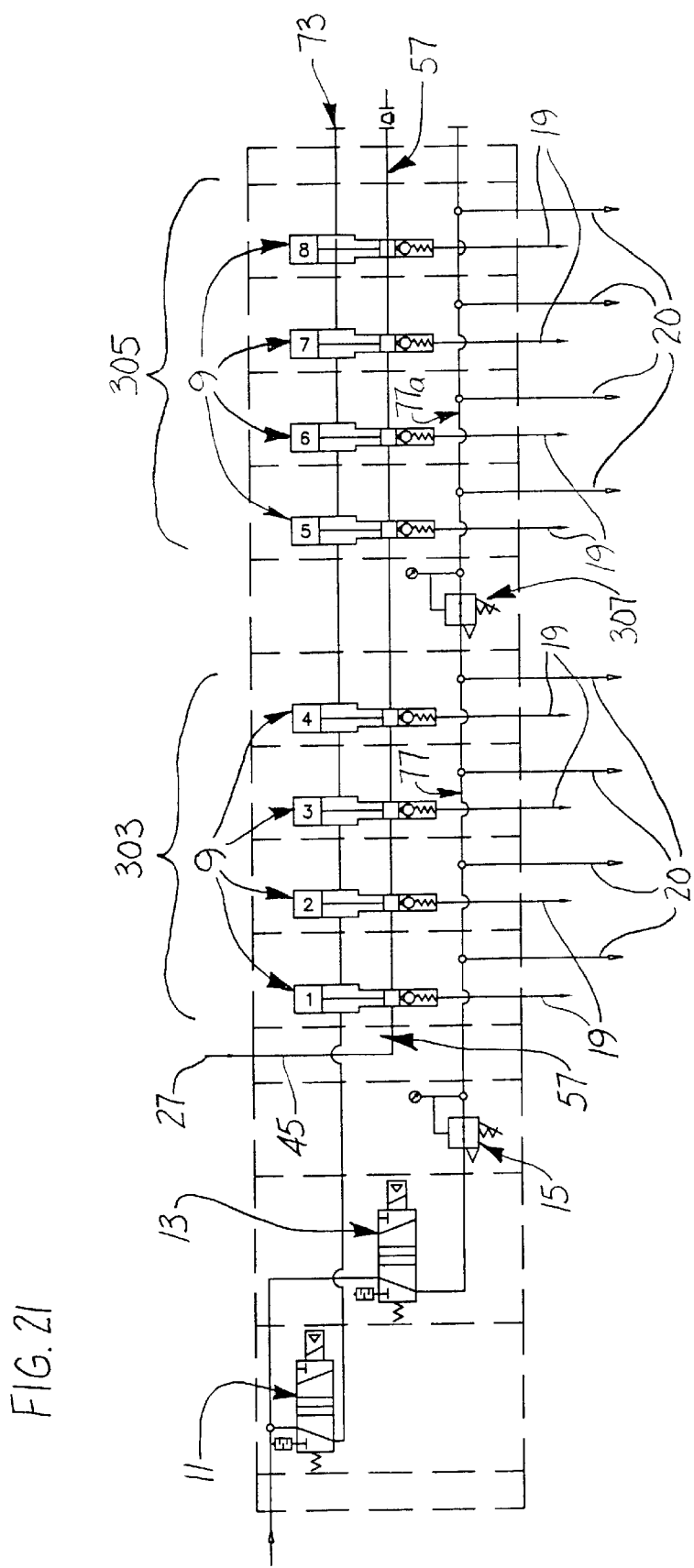
FIG. 21 is a schematic view re the FIG. 20 modification.
Figure 22:
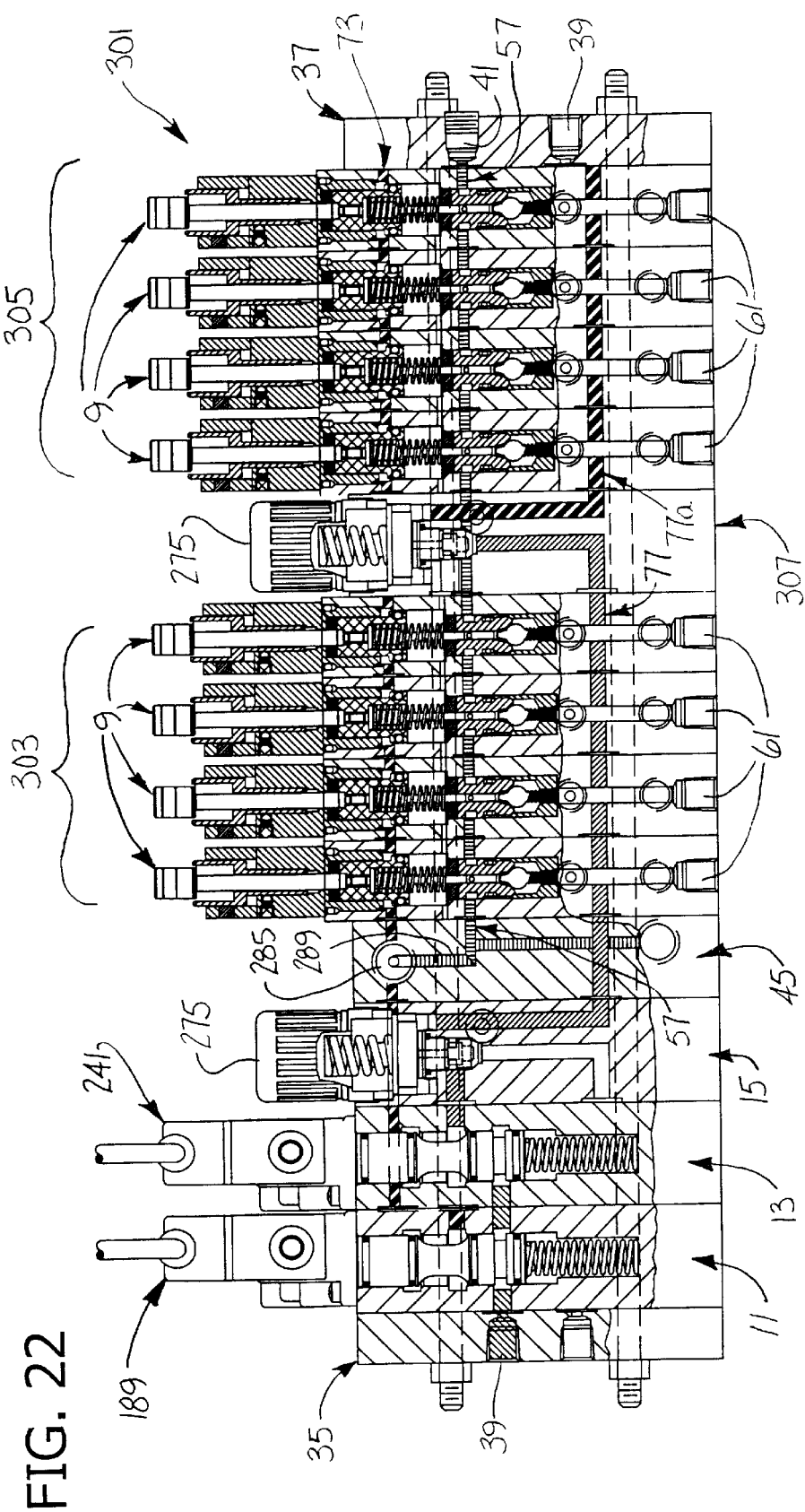
FIG. 22 is a view similar to FIG. 3 showing the FIGS. 20 and 21 modification.

A second embodiment of the lubricating system of this present invention, generally designated 301, is illustrated in FIGS. 20–22. This system is similar to the system 1, corresponding parts being identified by the same reference characters. System 301 differs from system 1 in that it comprises a first group 303 of air-operated modular lubricant injectors 9 lined up in a row in assembly 7A, a second group 305 of the air-operated modular lubricant injectors 9, and an air pressure regulator 307 interposed between the two groups 303, 305 of injectors 9. Each group, as shown, comprises four injectors. The number in each group may vary. The arrangement is such that aerifying air is delivered to the first group 303 at a first pressure regulated by the first air pressure regulator module 15, and aerifying air is delivered to the second group 305 at a second lower air pressure regulated by the second air pressure regulator module 307. The second air pressure regulator 307 is identical in construction to the first air pressure regulator 15, the second being disposed for receiving aerifying air from the (aerifying) air passages of the first group 303 of injectors 9 which define a first (aerifying) air manifold 77 and being operable to reduce the pressure of the air and to deliver it to the (aerifying) air passages of the second group 305 of injectors 9 which combine to form a second (aerifying) air manifold 77a. The second air pressure regulator 307 receives aerifying air via inlet 269 (FIG. 18) rather than inlet 261. The apparatus shown in FIGS. 20–22 is particularly advantageous when there is a need to supply aerifying air at different pressures to points of lubrication.

It will be understood that additional groups of the modular injectors and additional modular air pressure regulators can be added as needed.

It will be observed from the foregoing that the system of the present invention represents a substantial improvement over the stated prior lubrication systems. It can be sold as a complete system with an integrated lubricant reservoir, controller, air filter and modular assembly as described above, or the modules can be sold separately for installation with existing components. Installation is easy, requiring only connection of the modular assembly to available sources of lubricant and pressurized air, and to a controller. These connections are quick and easy to make. Further, the system can be configured to outlet lubricant and/or aerifying air at multiple locations, (i.e., at the exit ends or at the sides of the injectors) providing greater flexibility to the end user. The modular assembly is also easy to maintain, since any one or more of the modules can be quickly replaced with a new module.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A lubricating system for delivering charges of lubricant and air for aerifying the lubricant to multiple points of lubrication, said system comprising a plurality of air-operated lubricant injectors each operable in response to delivery thereto of operating air to deliver a charge of lubricant, said injectors being organized in a row in engagement with one another, each injector having a lubricant passage extending therethrough, the lubricant passages in the injectors being in end-to-end communication with one another and constituting a lubricant manifold extending through the row for receiving lubricant and charging said injectors therewith, each injector having a first air passage therein, the first air passages of the injectors being in end-to-end communication with one another and constituting a first air manifold extending through the row for receiving injector operating air and delivering it for operating the injectors, each injector also having a second air passage therein for receiving air for aerifying the charge of lubricant delivered by the injector, said second air passages being in end-to-end communication with one another and constituting a second air manifold extending through the row.

2. A lubricating system as set forth in claim 1 having a first valve mounted together with the injectors for controlling delivery of injector operating air to said first manifold and a second valve mounted together with the injectors for controlling delivery of aerifying air to said second manifold.

3. A lubricating system as set forth in claim 1 having an air pressure regulator mounted together with the injectors for regulating the pressure of aerifying air delivered to said second manifold.

4. A lubricating system as set forth in claim 3 having a first valve mounted together with the injectors for controlling delivery of injector operating air to said first manifold and a second valve mounted together with the injectors for controlling delivery of air to said pressure regulator.

5. A lubricating system as set forth in claim 1 wherein the row of injectors constitutes a modular assembly, each injector constituting a module thereof.

6. A lubricating system as set forth in claim 5 wherein each injector comprises a positive displacement expansible chamber device.

7. A lubricating system as set forth in claim 6 wherein each said expansible chamber device is adjustable for selectively varying its displacement.

8. An injector for delivering lubricant and air for being sprayed on a point of lubrication, comprising an elongate block having first and second opposite sides and first and second opposite ends, an air-operated positive displacement expansible chamber device in the block and a lubricant exit passage in the block extending from said device to a lubricant outlet in the block, said block having a lubricant supply passage extending from one side thereof to the other and a port for communication from said lubricant supply passage to said expansible chamber device, said block also having a first air passage extending from one side of the block to the other for receiving operating air and delivering it to the expansible chamber device, and a second air passage extending from one side of the block to the other for receiving air and for delivering it to aerify a charge of lubricant delivered by the expansible chamber device.

9. An injector as set forth in claim 8 wherein said expansible chamber device comprises a piston slidable in a cylinder in the block from a retracted position in a direction toward said second end of the block, said port being in communication with the cylinder.

10. An injector as set forth in claim 9 wherein the retracted position of the piston is determined by its engagement with a stop adjustably threaded in said first end of the block.

11. An injector as set forth in claim 8 wherein said lubricant outlet constitutes a first outlet at said second end of the block, and wherein said lubricant exit passage has a second outlet at one of said first and second sides of the block.

12. A modular lubricating system for delivering charges of lubricant to multiple points of lubrication, said apparatus comprising a plurality of modular air-operated lubricant injectors each operable in response to delivery thereto of operating air to deliver a charge of lubricant, said injectors being organized in a row in engagement with one another, each injector having a lubricant passage extending therethrough, the lubricant passages in the injectors being in end-to-end communication with one another and constituting a lubricant manifold extending through the row for receiving lubricant and charging said injectors therewith, each injector having a first air passage therein, the first air passages of the injectors being in end-to-end communication with one another and constituting a first air manifold extending through the row for receiving operating air and delivering it for operating the injectors, each injector also having a second air passage therein for receiving air for aerifying the charge of lubricant delivered by the injector, said second air passages being in end-to-end communication with one another and constituting a second air manifold extending through the row, a first modular valve mounted together with the injectors for controlling delivery of operating air to said first manifold, a modular air pressure regulator mounted together with the injectors for regulating the pressure of air delivered to said second manifold, and a second modular valve mounted together with the injectors for controlling delivery of air to said pressure regulator.

13. A modular lubricating system as set forth in claim 12 wherein each of said modular injectors, first and second modular valves and said modular air pressure regulator comprises a block having first and second opposite ends and first and second opposite sides, and wherein said blocks are held in assembly with the blocks in side-by-side engagement one with another.

14. A modular lubricating system as set forth in claim 13 wherein said blocks are held in assembly by tie rods extending through the blocks from one end of the assembly to an opposite end of the assembly.

* * * * *